(12) United States Patent
Prendergast

(10) Patent No.: US 7,735,159 B2
(45) Date of Patent: Jun. 15, 2010

(54) MONORAIL MOUNT FOR ENHANCED NIGHT VISION GOGGLES

(75) Inventor: Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 322 days.

(21) Appl. No.: 11/473,495

(22) Filed: Jun. 23, 2006

(65) Prior Publication Data

US 2007/0012830 A1     Jan. 18, 2007

Related U.S. Application Data

(60) Provisional application No. 60/693,554, filed on Jun. 23, 2005, provisional application No. 60/711,876, filed on Aug. 26, 2005.

(51) Int. Cl.
A42B 1/24        (2006.01)
(52) U.S. Cl. .......................................................... 2/422
(58) Field of Classification Search .................... 2/422, 2/6.2, 6.3, 6.5, 6.7; 403/330; 359/470
See application file for complete search history.

(56) References Cited

U.S. PATENT DOCUMENTS

| | | | |
|---|---|---|---|
| 1,226,101 A | 5/1917 | Marsden | |
| 2,284,180 A | 5/1942 | Thomas | |
| 4,449,787 A | 5/1984 | Burbo et al. | |
| 4,553,873 A | 11/1985 | Salice | |
| 4,689,834 A | 9/1987 | McCarthy et al. | |
| 4,697,783 A | 10/1987 | Kastendieck et al. | |
| 4,987,608 A | 1/1991 | Cobb | |
| 5,176,342 A | 1/1993 | Schmidt et al. | |
| 5,179,735 A | 1/1993 | Thomanek | |
| 5,226,181 A | 7/1993 | Polednak et al. | |
| 5,307,204 A * | 4/1994 | Dor | 359/400 |
| 5,331,684 A * | 7/1994 | Baril et al. | 2/6.2 |
| 5,339,464 A | 8/1994 | Dor | |
| 5,347,119 A | 9/1994 | Connors | |
| 5,408,086 A | 4/1995 | Morris et al. | |
| 5,467,479 A * | 11/1995 | Mattes | 2/6.3 |
| 5,469,578 A | 11/1995 | Mattes | |

(Continued)

OTHER PUBLICATIONS

U.S. Appl. No. 10/820,977, by inventor Prendergast, filed Apr. 7, 2004.

Primary Examiner—Katherine Moran
(74) Attorney, Agent, or Firm—Christie, Parker & Hale, LLP

(57) ABSTRACT

A mount for monocular enhanced night vision goggles having an ocular preference adjustment, an interpupillary adjustment, an eye relief adjustment, a tilt adjustment, a vertical adjustment, a quick stowage feature and a flip-up stowage feature is disclosed. An apparatus in accordance with the present invention has a housing secured to headgear. A vertical block is slidably coupled to the housing allowing it to translate vertically. A chassis is rotatably coupled to the vertical block allowing it to rotate between an in-use and flip-up position. A monorail is rotatably coupled to the chassis allowing it to rotate between an in-use and a quick stowage position. A carriage is slidably coupled to the monorail allowing for an eye relief adjustment. Enhanced night vision goggles are attached to a socket assembly which is movably coupled to the carriage allowing relocation in front of either eye while facing the same direction.

20 Claims, 30 Drawing Sheets

U.S. PATENT DOCUMENTS

| | | | |
|---|---|---|---|
| 5,471,678 A * | 12/1995 | Dor .................................. 2/6.7 |
| 5,506,730 A * | 4/1996 | Morley et al. ................ 359/815 |
| 5,542,627 A | 8/1996 | Crenshaw et al. |
| 5,581,806 A | 12/1996 | Capdepuy et al. |
| 5,648,862 A | 7/1997 | Owen |
| 5,703,354 A | 12/1997 | Wannagot et al. |
| 5,786,932 A * | 7/1998 | Pniel ........................... 359/409 |
| 5,914,816 A * | 6/1999 | Soto et al. .................... 359/630 |
| 6,141,160 A * | 10/2000 | Pniel ........................... 359/822 |
| D449,411 S | 10/2001 | Largeot |
| 6,457,179 B1 | 10/2002 | Prendergast |
| 6,472,776 B1 | 10/2002 | Soto et al. |
| 6,667,832 B2 * | 12/2003 | Caplan et al. ................ 359/409 |
| 6,751,810 B1 | 6/2004 | Prendergast |
| 6,957,449 B2 | 10/2005 | Prendergast |
| 7,219,370 B1 * | 5/2007 | Teetzel et al. .................... 2/6.2 |

* cited by examiner

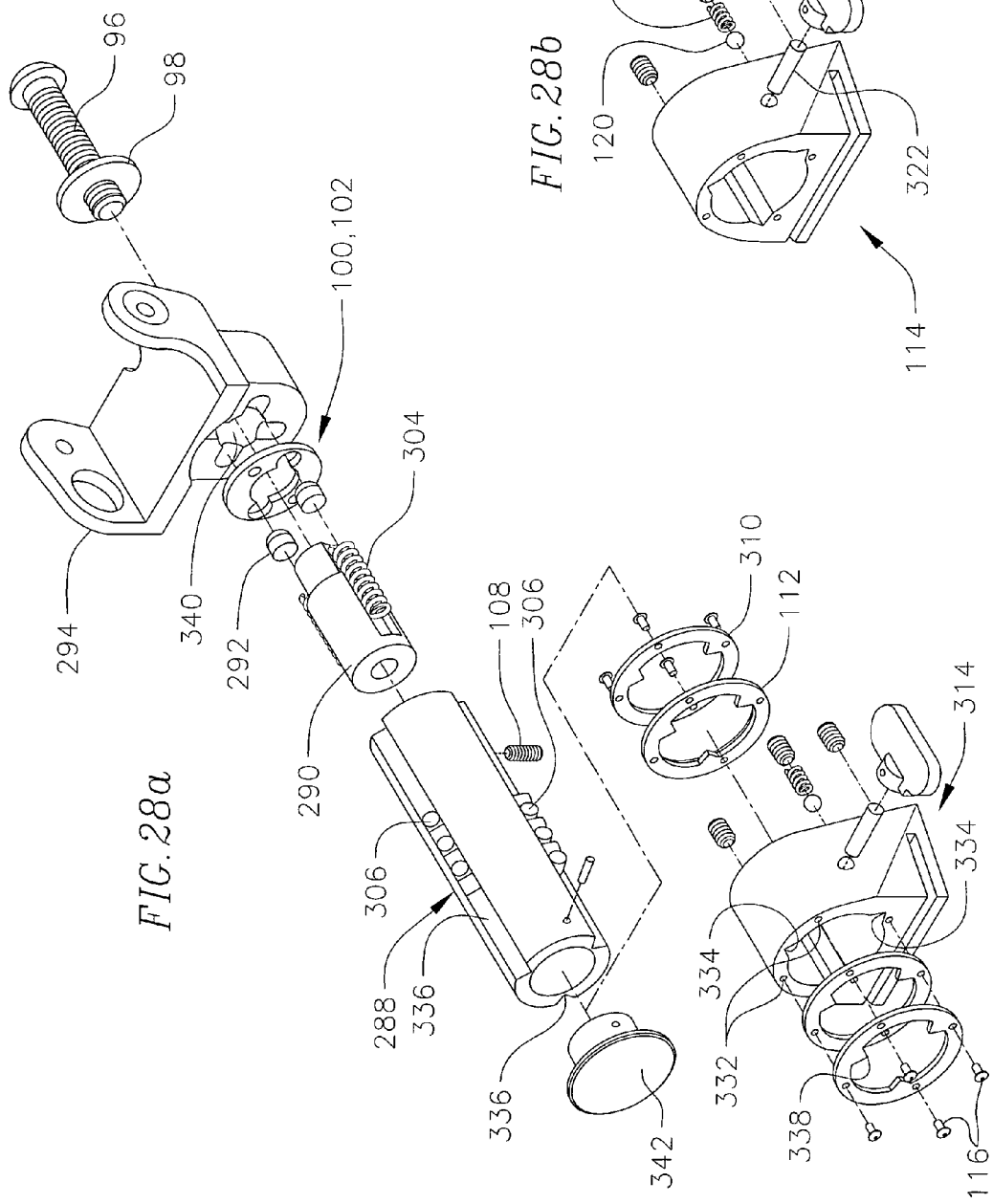

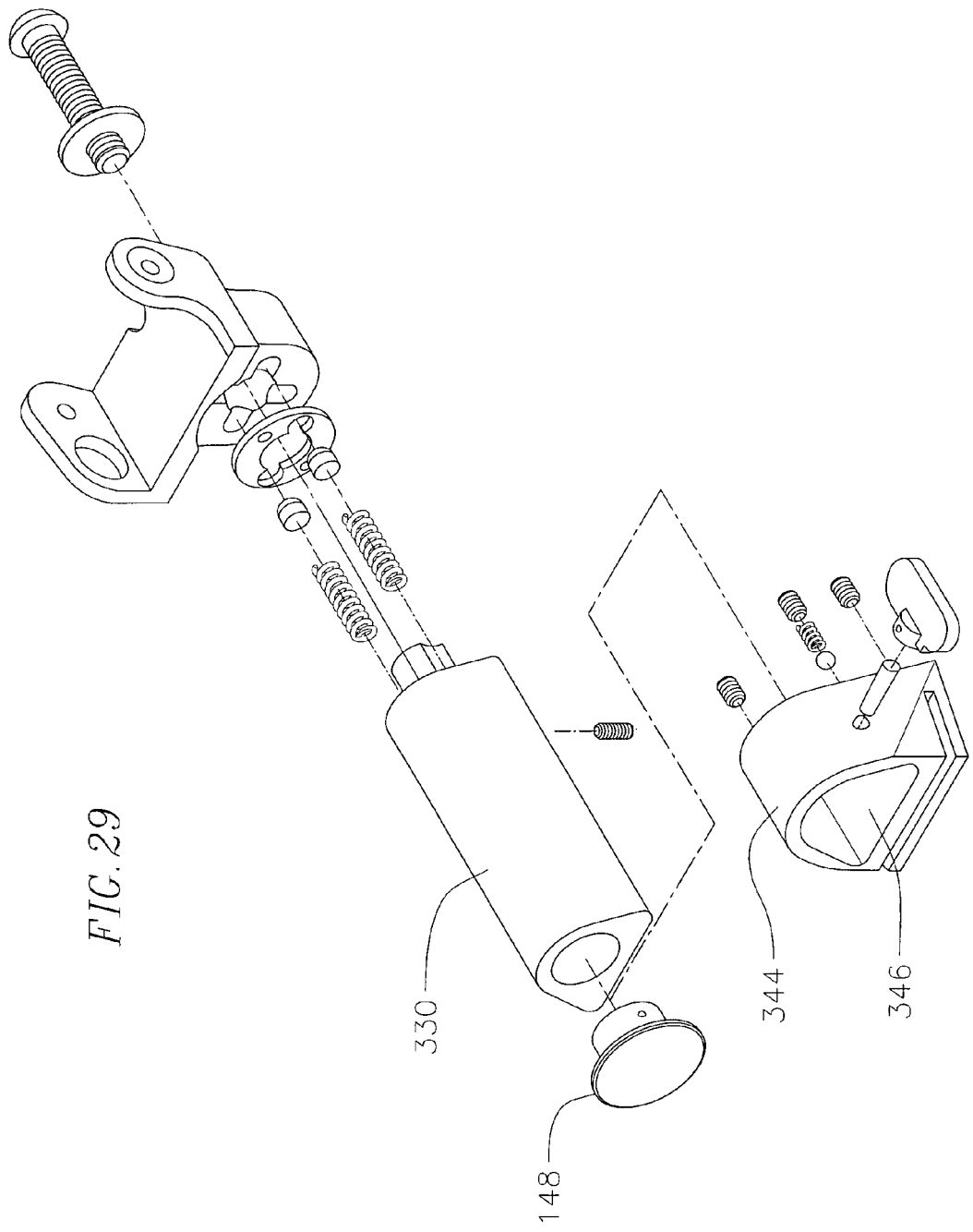

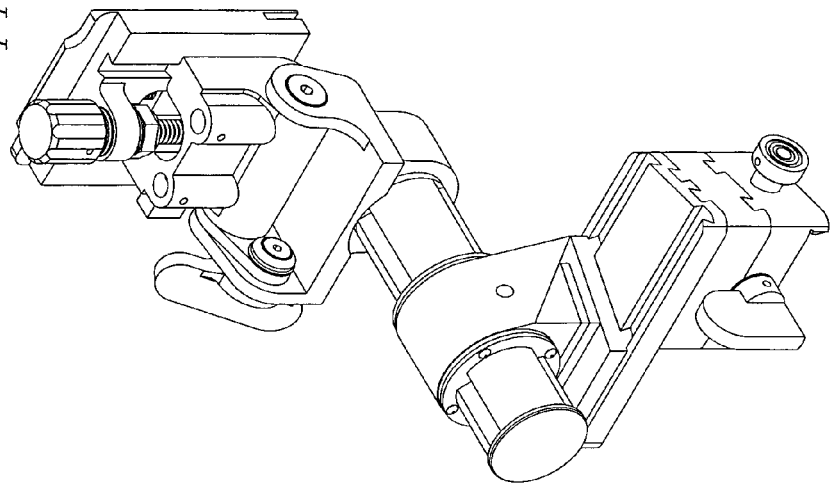
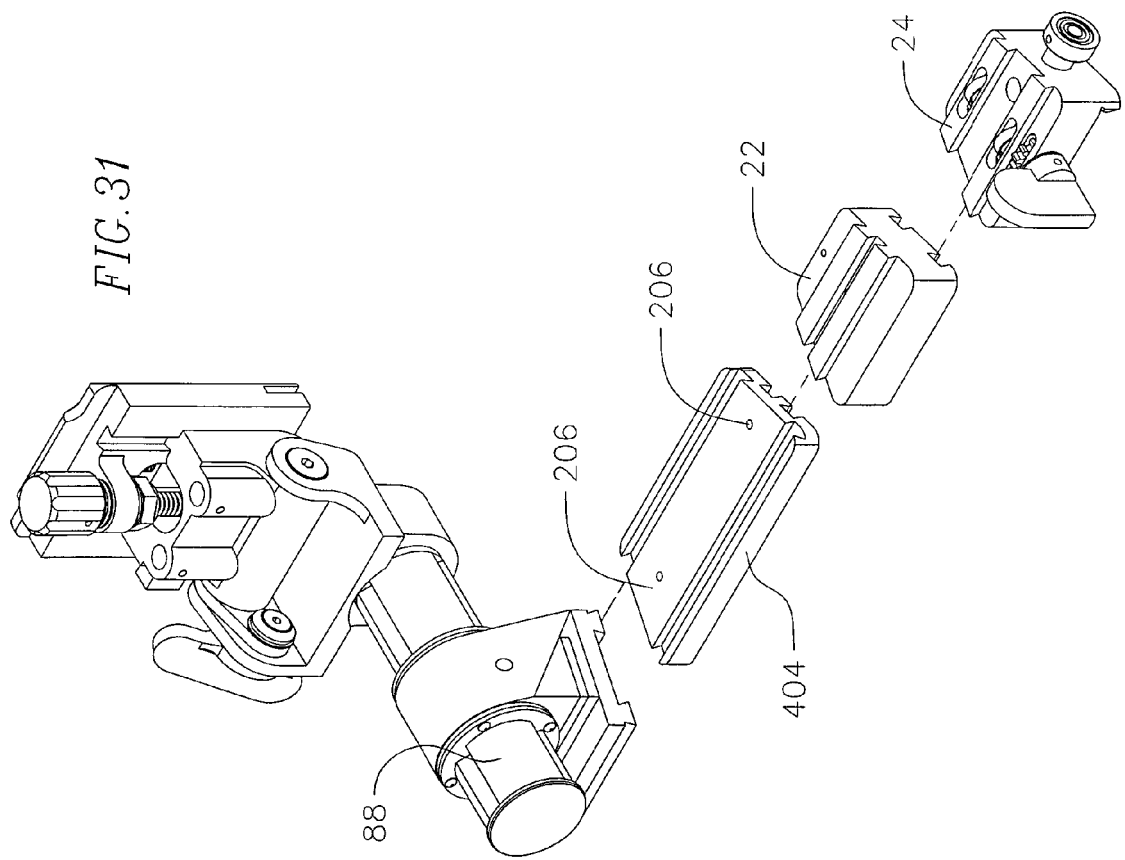

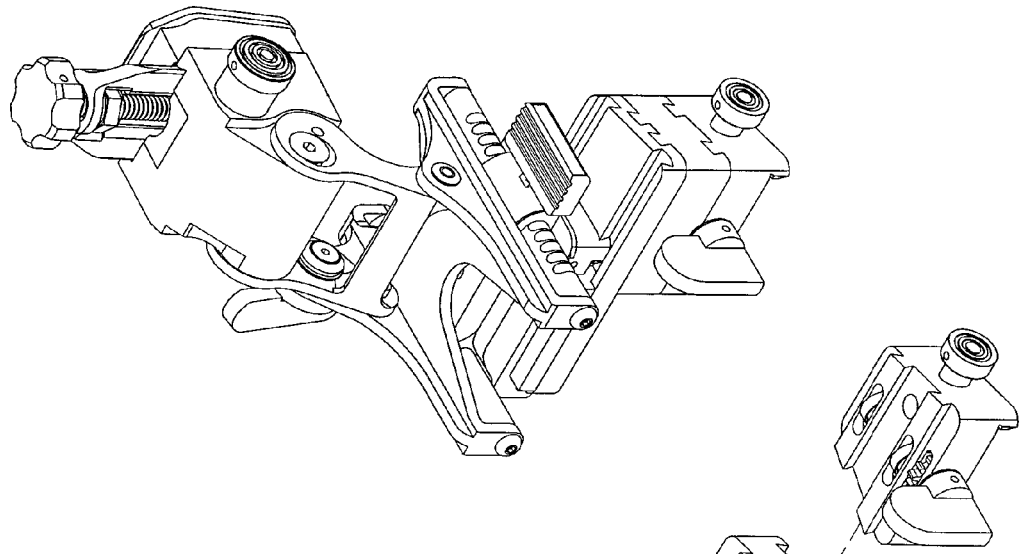
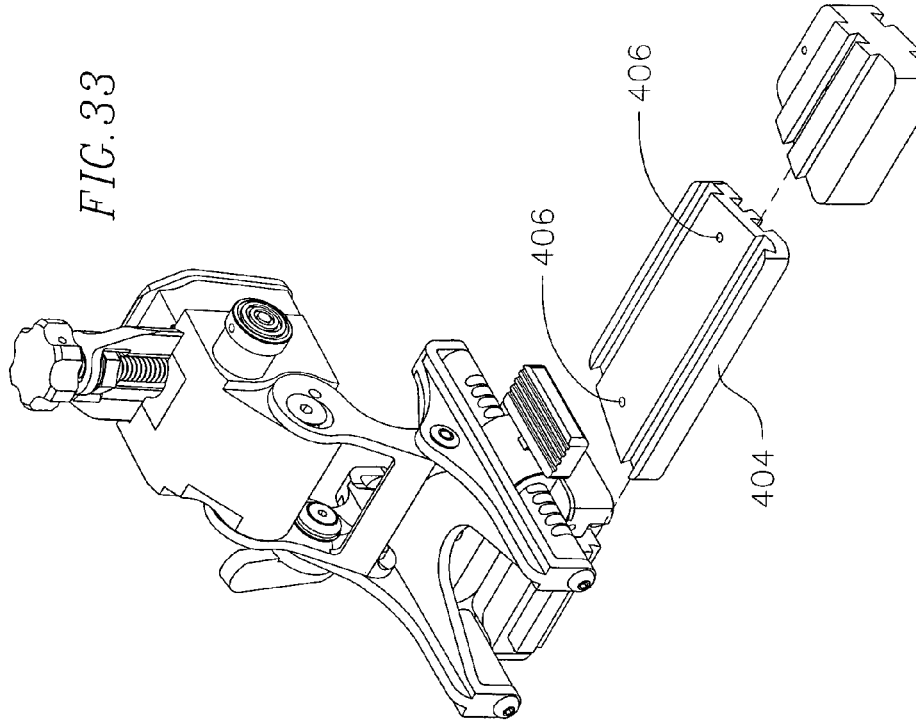

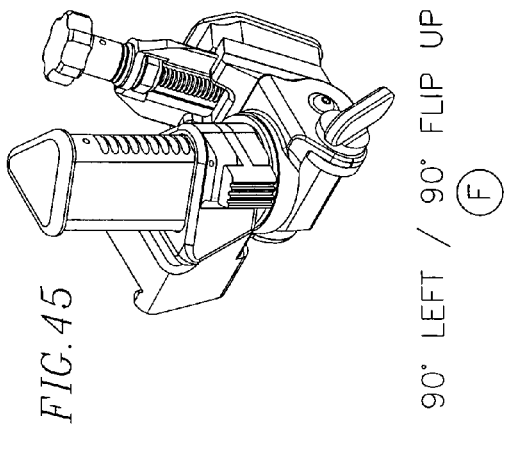
FIG. 43
90° FLIP UP (D)
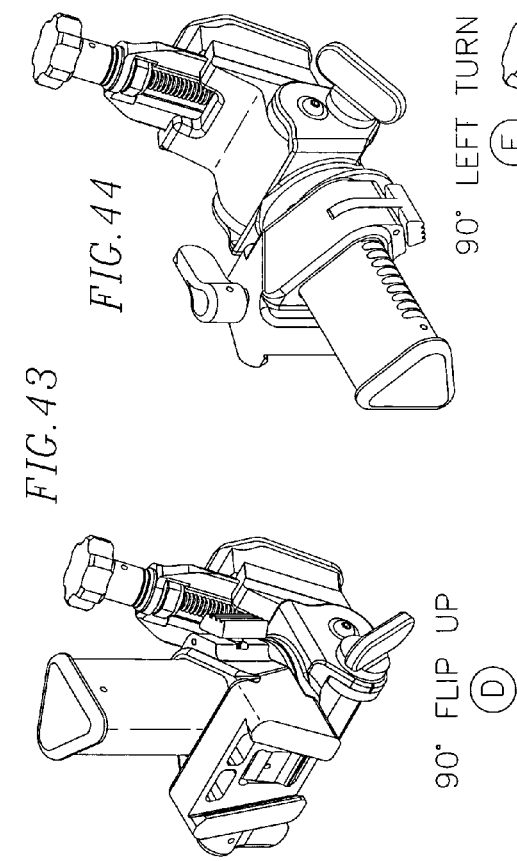
FIG. 44
90° LEFT TURN (E)
FIG. 46
90° RIGHT TURN (G)
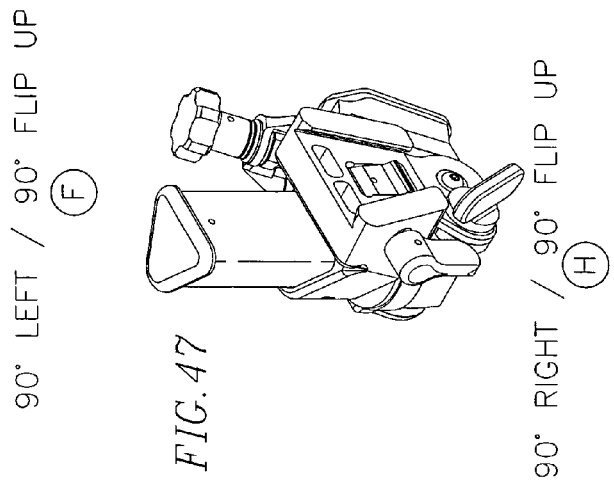
FIG. 45
90° LEFT / 90° FLIP UP (F)
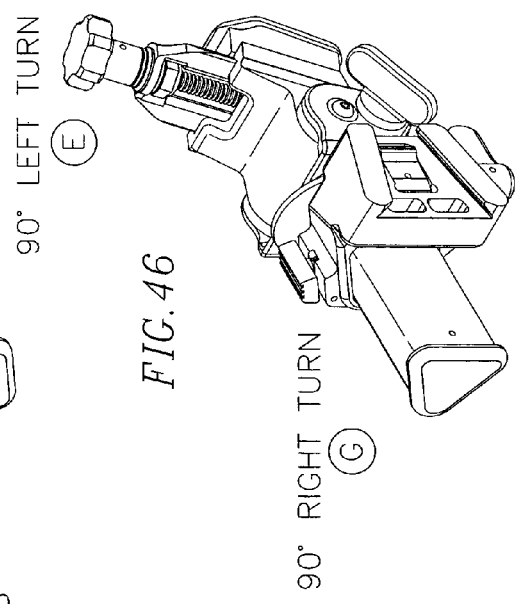
FIG. 47
90° RIGHT / 90° FLIP UP (H)

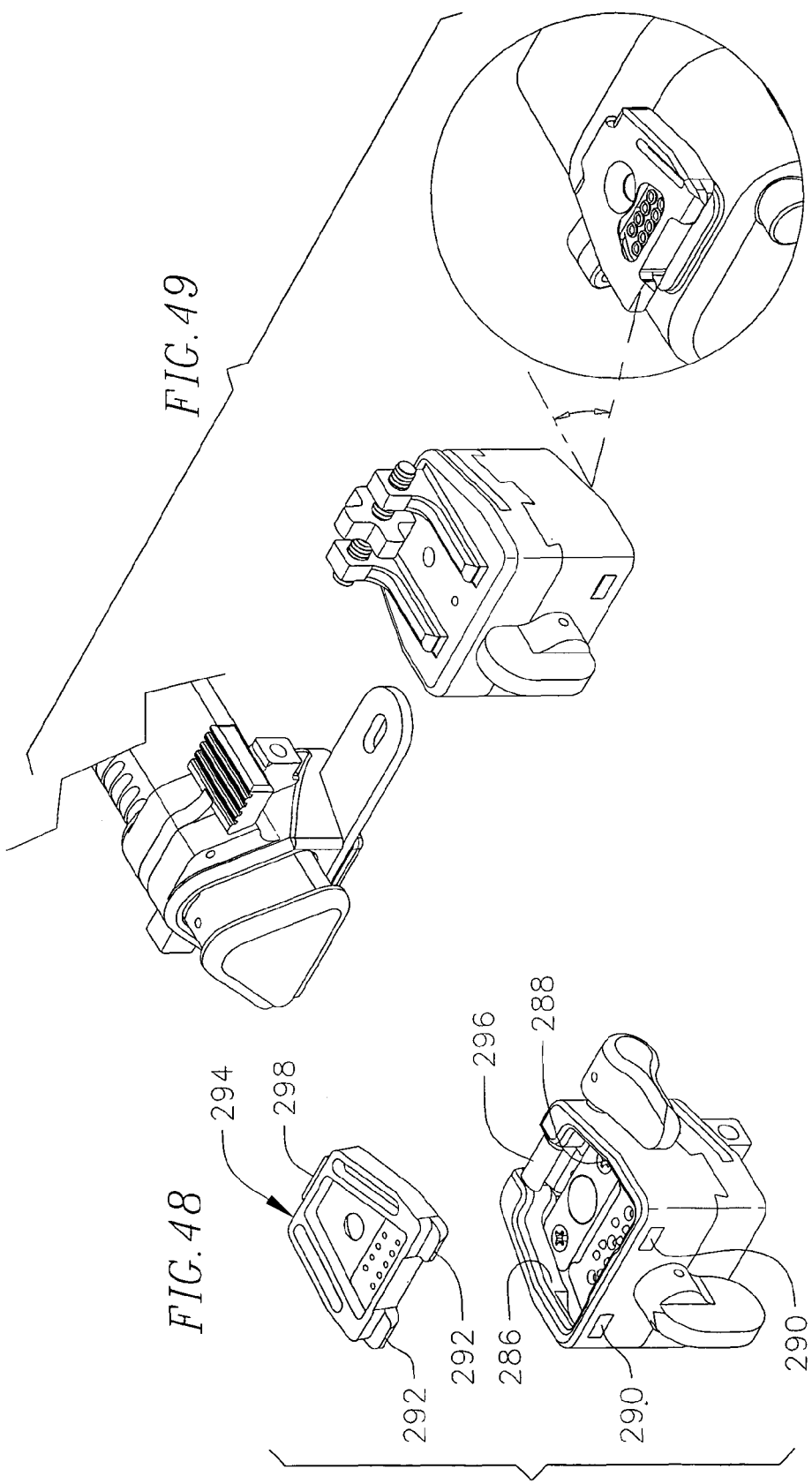

MONORAIL MOUNT FOR ENHANCED NIGHT VISION GOGGLES

CROSS-REFERENCE TO RELATED APPLICATIONS

This application claims priority to and the benefit of U.S. Provisional Patent Application No. 60/693,554, filed on Jun. 23, 2005 and 60/711,876, filed on Aug. 26, 2005, both applications filed in the United States Patent and Trademark Office, the entire content of which is incorporated herein by reference.

FIELD OF THE INVENTION

This invention relates generally to mounting assemblies for enhanced night vision goggles (ENVG), and more particularly to a multi-adjustable and multi-stowable monocular night vision goggle mount preferably having an ocular preference adjustment, an interpupillary adjustment, an eye relief adjustment, a tilt adjustment, a vertical adjustment, a quick stowage feature and a flip-up stowage feature.

BACKGROUND OF THE INVENTION

Night vision goggles are commonly used by military personnel for conducting operations in low light or night conditions. The night vision goggles used by the military typically include image intensifier tubes and associated optics that convert infrared and near infrared light into viewable images.

Assemblies for mounting night vision goggles to a helmet or other headpieces are well known in the art. These mounting assemblies allow a user's hands to remain free while viewing a scene through the night vision goggles. Prior mounting assemblies typically include one or more of the following features: positional adjustment of the night vision goggles between an in-use and flip-up stowed position; tilt angle adjustment of the night vision goggles relative to the user's eyes; and focal adjustment (eye relief adjustment) of the location of the night vision goggles relative to the user's eyes.

Known mounting assemblies for night vision goggles encompass a flip-up helmet mount that attempts to provide all of the features identified above. However, when the previously disclosed mounting assemblies are flipped up, the night vision goggles rest a few inches away from the front edge of the helmet or other headpiece. This places the center of gravity of the night vision goggles/mount assembly further forward than simply the helmet or other headpiece alone and may place an undue strain on the user's neck. It is desirable to have a night vision mounting assembly that accomplishes the features identified above, yet places less strain on the user's neck.

Furthermore, when the previously disclosed assemblies are flipped up, the user has a tendency to forget about their presence. The night vision goggles protrude beyond the user's helmet or other headpiece and can be damaged when the user inadvertently bumps into surrounding environment, such as the roof inside a vehicle. It is desired that a mount for the night vision goggles have a stowage location that is as near as possible to the user's helmet or other headpiece, as this would reduce accidental damage. Furthermore, it is desired for the mount to have a quick stowage feature that allows the night vision goggles to move out of the line of sight, but still be within the peripheral vision range, as a constant reminder of the presence and location of the night vision goggles.

Prior night vision goggles have adapted to be used with both eyes for viewing. The night vision goggles are placed directly in front of both eyes and display an image to both eyes. When a user uses the night vision goggles during low light conditions, a bright light can essentially blind the user through over-exposure of light. The user may become disoriented for a period of time until the eyes readjust. To limit this problem, it is desirable to use a monocular night vision goggle that will provide information to only one eye. The user simultaneously sees an unobstructed view through one eye and an enhanced image in the other, and preferably the user is able to locate the night vision goggles in front of either eye, based upon preference or need. Therefore, it is desirable for a single mount to be able to be used for either eye, eliminating the need for a right eye mount and a left eye mount.

BRIEF DESCRIPTION OF THE DRAWINGS

FIG. 28a is an exploded view of alternate embodiment of a monorail helmet mount of the present invention.

FIG. 28b is a perspective view of a carriage for use with a monorail helmet mount as shown in FIG. 28a.

FIG. 29 is a perspective view of yet another embodiment of a monorail helmet mount of the present invention.

FIG. 31 is an exploded view of a helmet mount including a shuttle used for ocular preference selection.

FIG. 32 is a perspective view of the helmet mount of FIG. 31.

FIG. 33 is an exploded view of an alternate helmet mount including a shuttle used for ocular preference selection.

FIG. 34 is a perspective view of the helmet mount of FIG. 33.

FIGS. 43-47 illustrate various stowage positions of the helmet mount of FIG. 40.

FIG. 48 is a perspective view of an alternate socket assembly with a tip-in interface.

FIG. 49 is a partially exploded view of a helmet mount including the socket assembly of FIG. 48.

DETAILED DESCRIPTION

Figure 1:
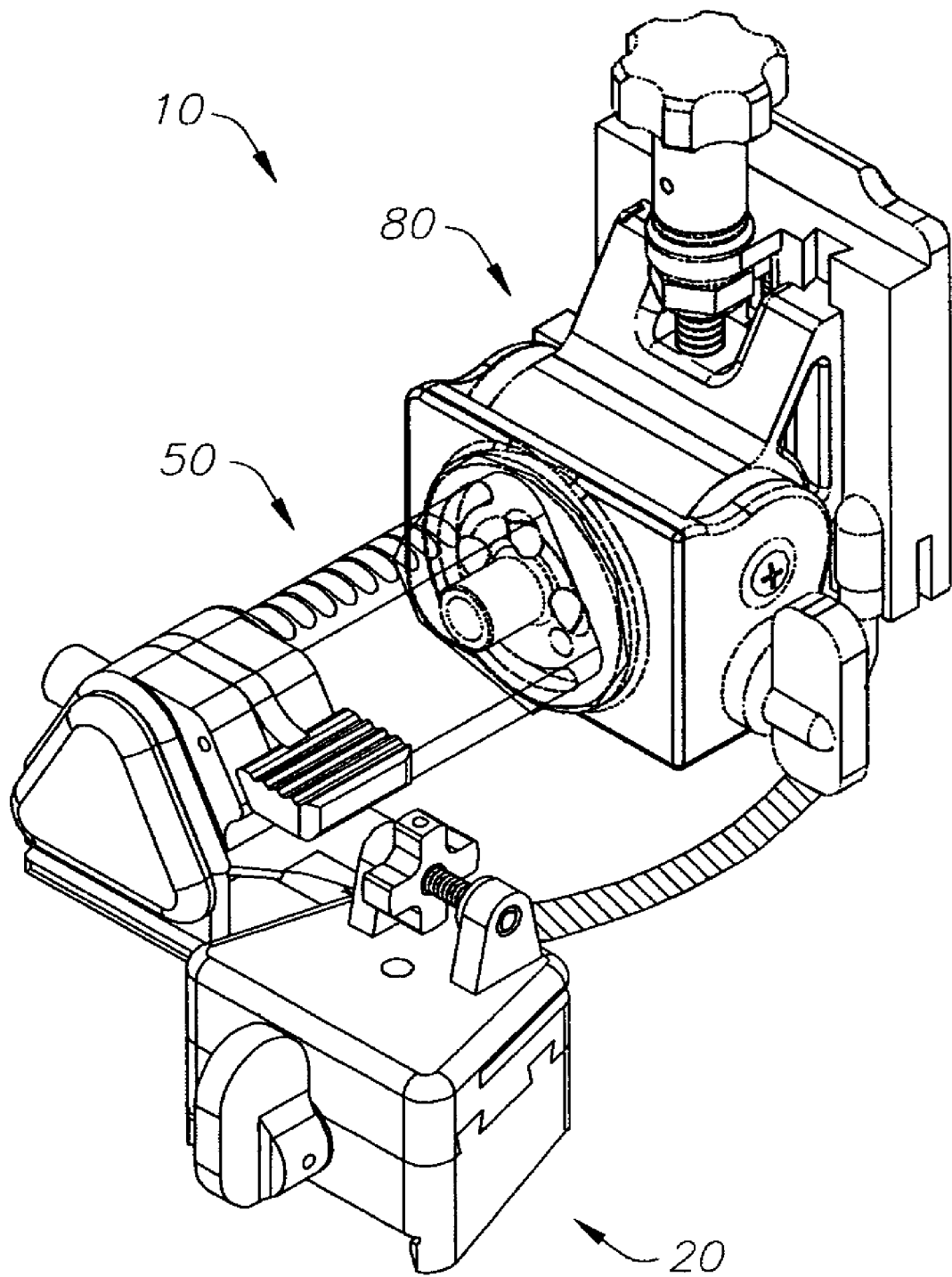
FIG. 1 is a perspective view of an exemplary embodiment of a monorail helmet mount of the present invention.

Referring to FIG. 1, an exemplary embodiment of a monorail helmet mount 10 of the present invention includes a socket assembly 20 to which enhanced night vision goggles (ENVG) (not shown) may be attached, a monorail assembly 50 for eye relief adjustment of the ENVG (with the monorail shown in phantom) and a housing assembly 80 which allows for vertical adjustment, quick stowage and flip-up stowage of the ENVG.

Figure 2:
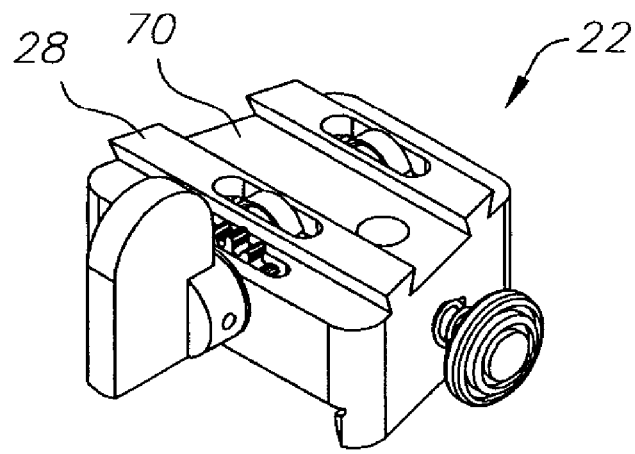
FIG. 2 is a top perspective view of a lower socket assembly of one embodiment of the present invention.
Figure 3:
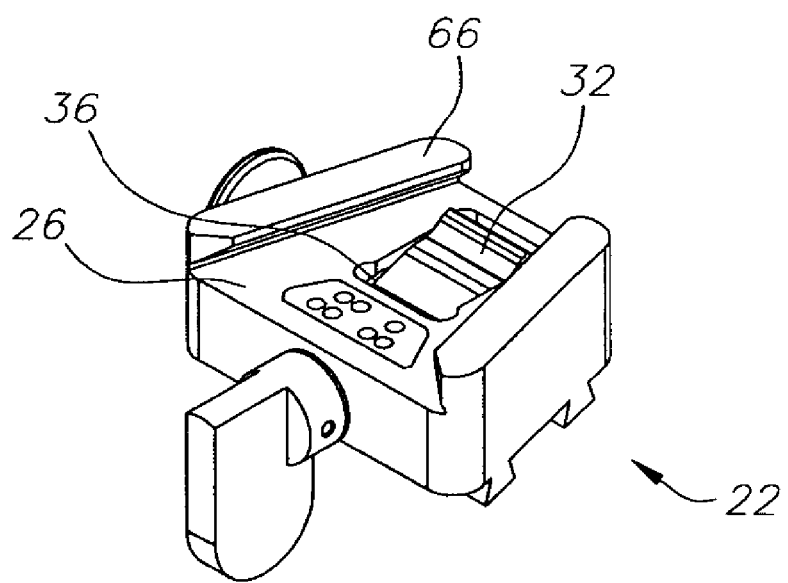
FIG. 3 is a bottom perspective view of a lower socket assembly of one embodiment of the present invention.
Figure 4:
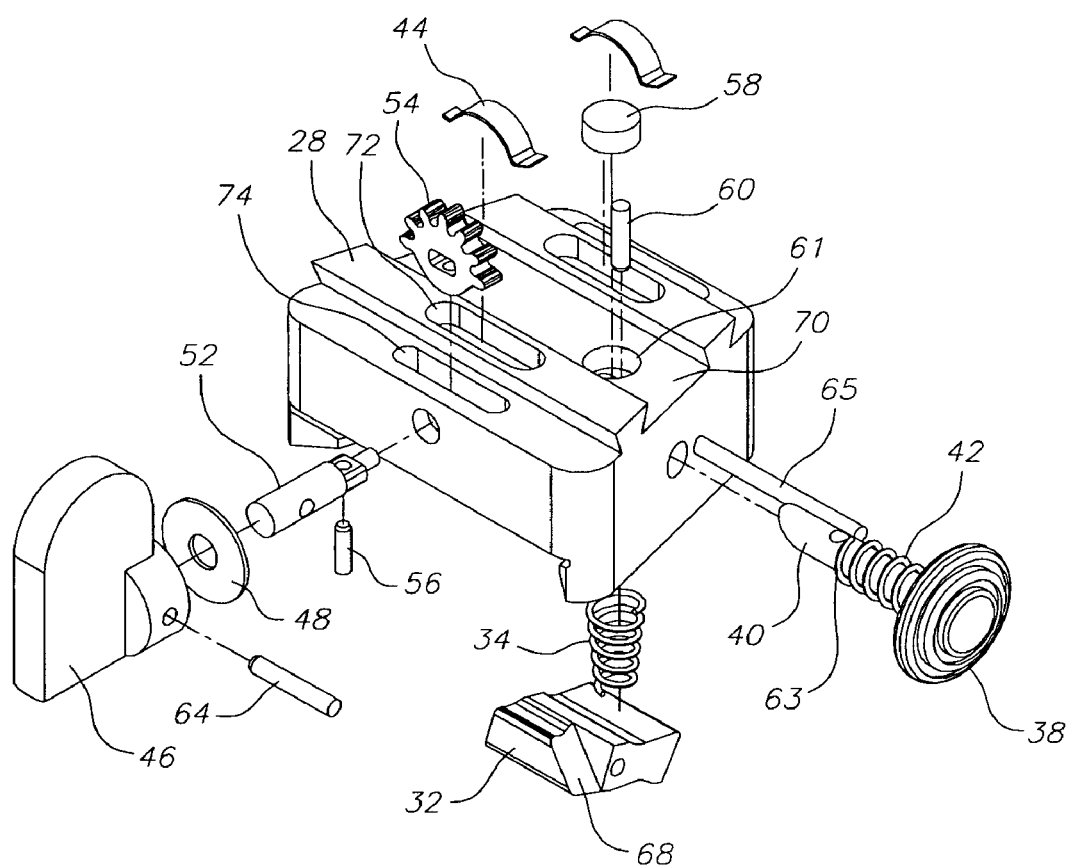
FIG. 4 is an exploded top view of a lower socket assembly of one embodiment of the present invention.

The socket assembly 20 of one embodiment of the present invention includes a lower socket 22 (FIG. 2) and an upper socket 24 (FIG. 6), the lower socket assembly and the upper socket assembly being slidably connected as described in more detail below. Referring now to FIGS. 2-4, an exemplary embodiment of the lower socket assembly 22 includes an ENVG receiving area 26 adapted to receive and house the ENVG. More specifically, the receiving area 26 is tapered and has rails 66 adapted to receive an ENVG lock plate. Generally centrally located within the receiving area 26 is a lock 32 housed in a lock recess 36 and maintained in the lower socket 22 by a lock pin 65. A lock spring 34 located underneath the lock 32 biases the lock into an engaged position, the lock spring being insertable into a lock spring hole 61 which is subsequently covered by a plug 58 (FIG. 4). In the engaged position, a portion of the lock protrudes from the receiving area 26, allowing the lock to securely maintain the ENVG attached to the lower socket 22. When an ENVG is inserted into the receiving area 26, a leading edge of the ENVG lock overcomes the spring 34 bias to rotate the lock 32 around the lock pin 65 into a disengaged position wherein the lock is level with or beneath the receiving area 26, allowing the ENVG lock plate to slide into the receiving area. Once the leading edge of the ENVG lock plate clears the lock 32, the spring 34 biases the lock back into the engaged position.

Referring now to FIG. 4, the lower socket 22 includes a release button 38 and a release shaft 40 to move the lock 32 from the engaged position into the disengaged position. More specifically, the release shaft 40 has an inclined end portion engageable with an inclined surface 68 of the lock 32. When the release button 38 is pressed, the inclined end portion of the release shaft 40 engages the inclined surface 68 of the lock 32, overcomes the lock spring 34 bias, and moves the lock in the disengaged state. When the release button 38 is released, a release button spring 42 biases the release button away from the lock 32, allowing the lock to return to the engaged state. The release shaft is maintained in the lower socket 22 by a pin 60 inserted into a pin hole. A cavity (not shown) within the lower socket 22 allows the pin limited movement with the lower socket, permitted the lock shaft 40 to be moved as discussed above.

Figure 5:
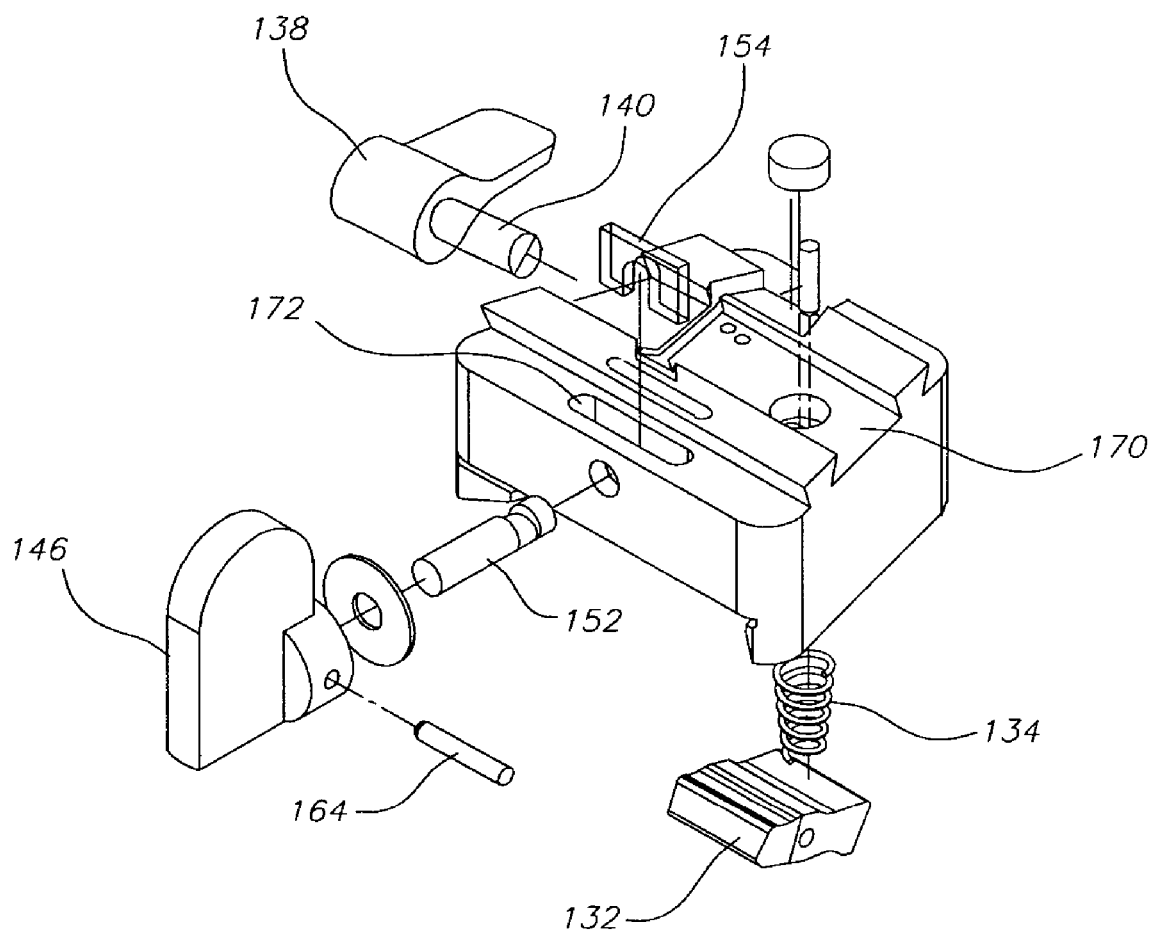
FIG. 5 is an exploded top view of an alternate embodiment of a lower socket assembly of one embodiment of the present invention.
Figure 13:
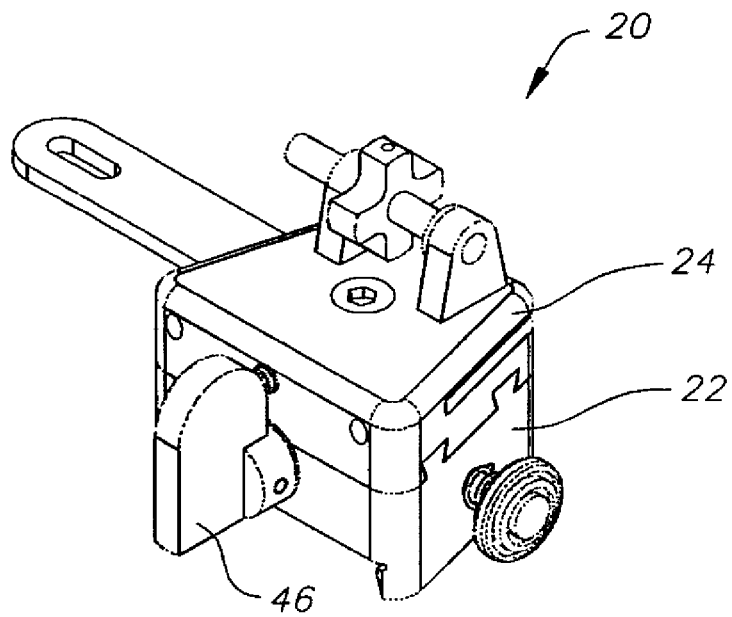
FIG. 13 is a perspective view of a complete socket assembly of one embodiment of the present invention.
Figures 13A, 13B:
FIGS. 13A and 13B show alternate embodiments of a release knob and a rotary lever, respectively.

In an alternate embodiment, as shown in FIG. 5, a release lever 138 having a release shaft 140 is provided. The release shaft 140 is attached to a lock 132 allowing rotation of the release lever 138 to overcome a lock spring 134 bias and move the lock from the engaged state to the disengaged state. Exemplary alternative embodiments of a rotary knob 78 and a lever 79 are shown in FIGS. 13A and 13B, respectively.

Referring now to FIGS. 2 and 4, the lower socket 22 includes two dovetail rails 28 which protrude from an upper surface 70 of the lower socket and which correspond to two dovetail recesses 30 on the upper socket 24 as described in more detail below.

The upper surface 70 of the lower socket assembly 22 further includes two leaf spring recesses 72 which house two leaf springs 44. The leaf springs 44 serve to provide tension between the lower and upper sockets 22, 24 to prevent random undesired movement between the connected socket assemblies (FIG. 13). Additionally, the upper surface 70 has a lower socket gear recess 74 which houses a lower socket gear 54. The lower socket gear 54 interacts with a gear rack 76 on the upper socket 24 (FIG. 9) to overcome the tension of the leaf springs 44 and allow movement between the connected sockets 22, 24 when the gear is rotated. More specifically, a gear shaft 52 is connected between the gear 54 and a lever 46, the lever having a flat surface to allow a user to easily grip and rotate the lever. A lever pin 64 may secure the lever 46 to the shaft 52 and a gear pin 56 may secure the shaft to the gear 54. Additionally, a washer 48 may be inserted between the lever 46 and the lower socket assembly 22 to reduce friction.

Referring now to FIG. 5, an alternate embodiment of the lower socket 121 includes a cam lock assembly in lieu of the gear assembly as described above. More specifically, an upper surface 170 of the lower socket 121 includes a cam recess 172 which houses a cam lock 154. The cam lock 154 is coupled to a cam shaft 152 adapted to move the cam lock when rotated. A user may rotate the cam shaft 152 by rotating a cam lever 146, the cam lever being coupled to the cam shaft by a pin 164. Rotation of the cam shaft 152 cause the cam lock 154 to move between an engaged position in which the cam lock is biased against a surface of the upper socket 24 and a disengaged position in which the cam lock is not in contact with the upper socket. When the cam lock 154 is in the disengaged state, a user is able to move the lower socket 22 with respect to the upper socket 24 by applying a lateral force to the lower socket. On the other hand, in the engaged state, the cam lock prevents the lower and upper sockets 22, 24 from sliding with respect to each other. In an alternate embodiment, a lock mechanism may be used which clamps the upper socket 24 against the lower socket 22 in compression to prevent the sockets from moving with respect to each other.

Figure 6:
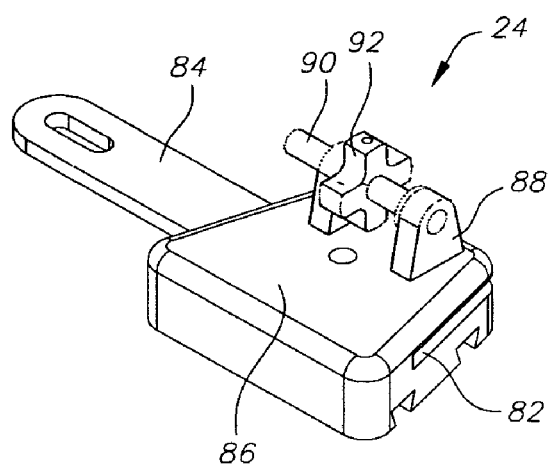
FIG. 6 is a top perspective view of an upper socket assembly of one embodiment of the present invention.
Figure 7:
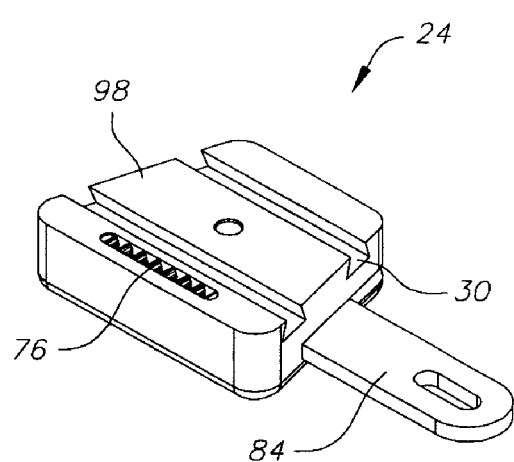
FIG. 7 is a bottom perspective view of an upper socket assembly of one embodiment of the present invention.
Figure 8:
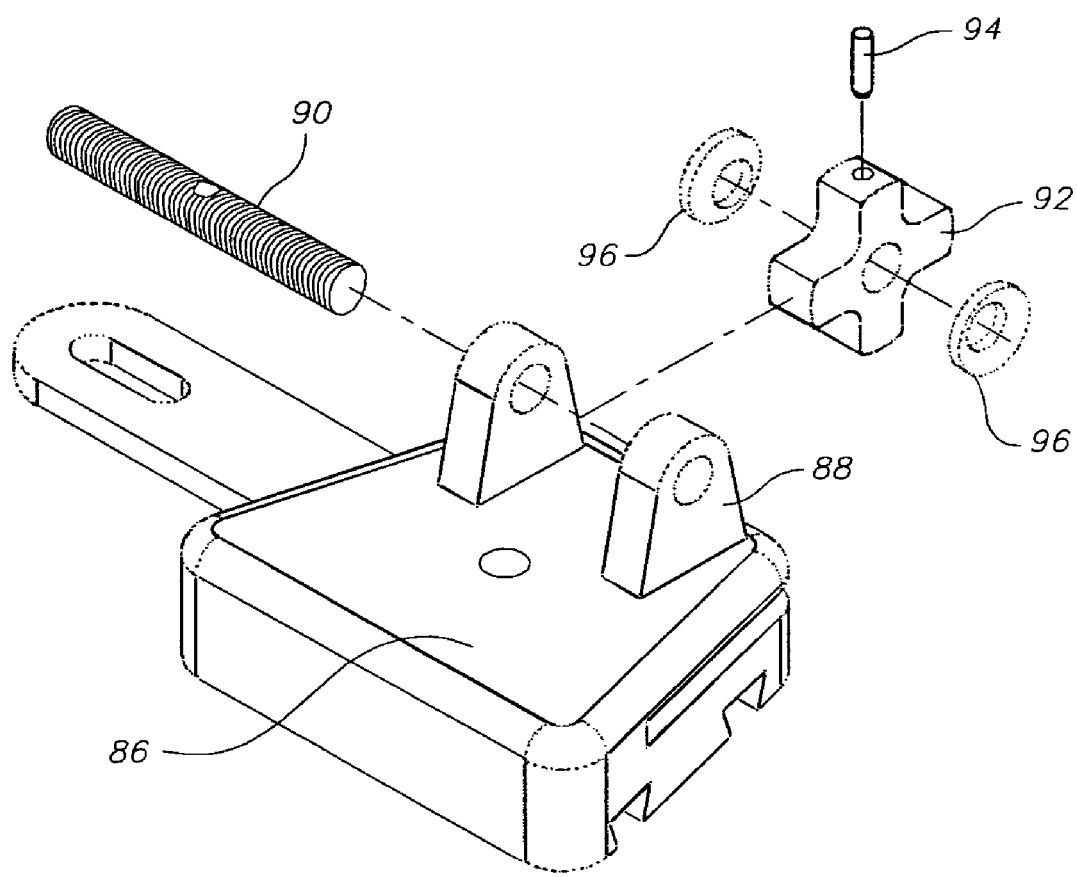
FIG. 8 is an exploded top view of an upper socket assembly of one embodiment of the present invention.

Referring now to FIGS. 6-9, an exemplary embodiment of the upper socket 24 is adapted to be slidably connected to the lower socket 22. Referring to FIG. 6, the upper socket 24 includes a link recess 82 adapted to house a swing link 84. As shown in FIGS. 6 and 8, a top surface 86 of the upper socket 24 supports a lock wheel assembly which serves to align and lock the socket assembly 20 with the monorail assembly 50 as is described in more detail below. The lock wheel assembly includes two bases 88 through which a threaded lock shaft 90 is inserted. Rotatably mounted on the lock shaft 90 is a lock wheel 92. The lock wheel 92 may be shaped to provide a surface to allow it to be easily rotated by a user. For instance, the lock wheel may be in the shape of a cross or an "X." A lock pin 94 may be inserted into the lock wheel 92 to connect the lock wheel to the lock shaft. Thus, the lock wheel 92 may be rotated to engage or disengage the lock shaft from the monorail assembly 50 as described below. Additionally, a washer 96 may be inserted between the lock wheel 92 and each base 88 to reduce friction between the lock wheel and each base.

Figure 9:
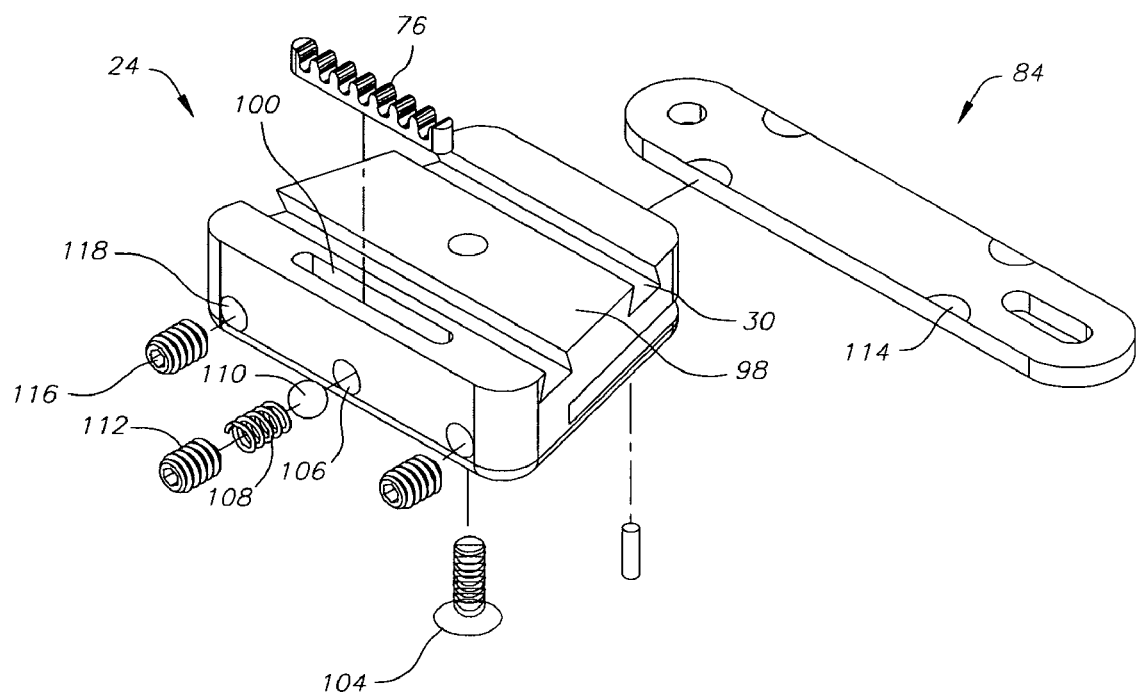
FIG. 9 is an exploded bottom view of an upper socket assembly of one embodiment of the present invention.
Figure 11:
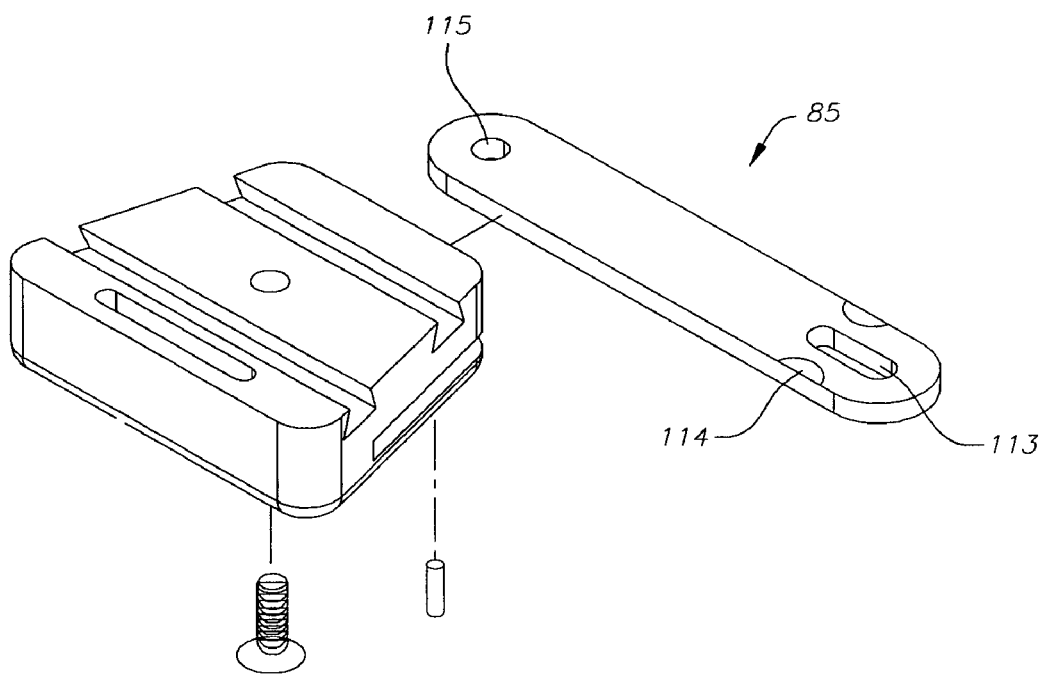
FIG. 11 is an exploded bottom view of the upper socket of FIG. 10.

As shown in FIGS. 7 and 9, a bottom surface 98 of the upper socket 24 includes a pair of dovetail recesses 30 adapted to receive the pair of dovetail rails 28 on the lower socket 22. Additionally, the bottom surface 98 includes a rack recess 100 which houses a gear rack 76. The gear rack 76 is adapted to receive the lower socket gear 54 to allow relative movement between the lower and upper sockets 22, 24.

In an alternate embodiment of a socket assembly as shown in FIG. 48, an ENVG receiving area 280 has a "tip-in" interface to receive the ENVG. The ENVG receiving area includes a front wall 282, a rear wall 284 and two lateral walls 286, 288. The front wall 282 includes two notch openings 290 which are adapted to receive corresponding notches 292 on an ENVG hot shoe 294. Additionally, the rear wall 284 includes a goggle catch 296 which is adapted to receive a latch 298 on the ENVG hot shoe 294.

Figure 50:
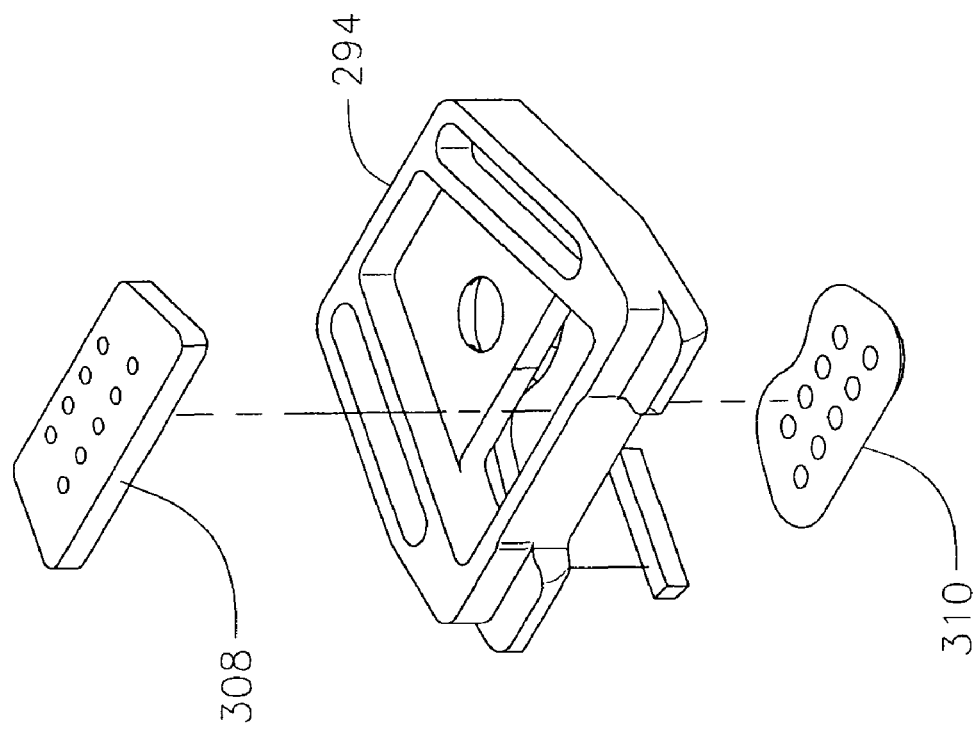
FIG. 50 is an exploded view of an exemplary hot shoe of the present invention.

As shown in FIG. 50, the hot shoe 294 includes a pogo insulator 308 and an elastomeric seal 310 which provides additional protection to the electrical connectors (pogos), particularly against moisture and debris from damaging the connectors. Additionally, as shown in FIG. 48, the hot shoe 294 may include a rubber bumper 297 to further insulate the electrical connectors from moisture as well as to provide a secure fit between the hot shoe and the socket assembly.

To mate the hot shoe 294 with the ENVG receiving area, a user "tips" the hot shoe to direct the notches 292 into the corresponding notch openings 290. The user then rotates the ENVG such that the latch 298 encounters the goggle catch 296 and snaps into the latch. The tip-in ENVG receiving area serves to effectively secure the ENVG to the mount while effectively eliminating side loading and scooping which may damage the electrical connection in the ENVG receiving area 280.

Referring again to FIG. 9, a swing link 84 is housed in the link recess 82 and rotatably coupled to the upper socket 24 by a swing link pin 104 inserted through the top surface 86 of the upper socket 24. In one exemplary embodiment, the swing link 84 is made from titanium. In one exemplary embodiment, the swing link 84 includes two elongated slots 113. Each elongated slot 113 houses a swing link pin 104 to secure the swing link 84 to, for example, the socket assembly 20 or the carriage 158. The elongated slots 113 allow the swing link 84 limited lateral movement, as is described in more detail below.

The swing link 84 has two states, an engaged state and a disengaged state. In the engaged state, the swing link 84 is held in place by a detent ball and spring system. More specifically, the upper socket 24 includes a centrally disposed detent cavity 106 which extends through the upper socket generally perpendicular to the dovetail recesses 30. Housed within the detent cavity 106 is a detent spring 108 and a detent ball 110 both of which are sealed into the detent cavity on one side by a set screw 112 and on the other side by the swing link 84. In one exemplary embodiment, the swing link 84 includes four release notches 114, two on each longitudinal edge near either end, the release notches being adapted to receive the detent ball 110. In the engaged state, the detent ball 110 is nestled in a release notch 114 of the swing link 84 and the swing link pin 104 is located at one end of the elongated slot 113, keeping the swing link fixed. If a user applies enough lateral force to the swing link 84 to overcome the force of the detent ball 110 and the detent spring 108, the swing link will become disengaged from the detent ball and the swing link pin 104 encounters the opposite end of the elongated slot 113. In the disengaged state, the swing link 84 is pivotable around the swing link pin 104.

Figure 10:
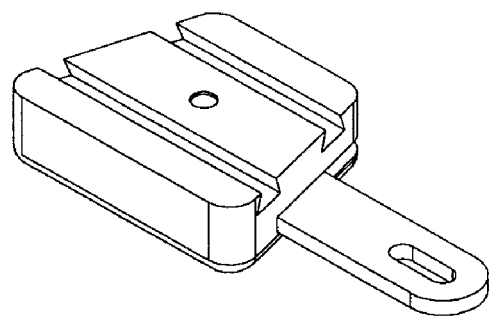
FIG. 10 is a bottom perspective view of an alternate embodiment of an upper socket assembly of the present invention.

In an alternate embodiment, as shown in FIG. 10, a swing link 85 has a single elongated slot 113 and two adjacent notches 114 near one end and a swing link pin hole 115 near an opposite end. In another alternate embodiment of the present invention, additional set screws 116 may be inserted into set screw cavities 118 to allow for more secure fixation of the swing link 84 if necessary.

Figure 30A:
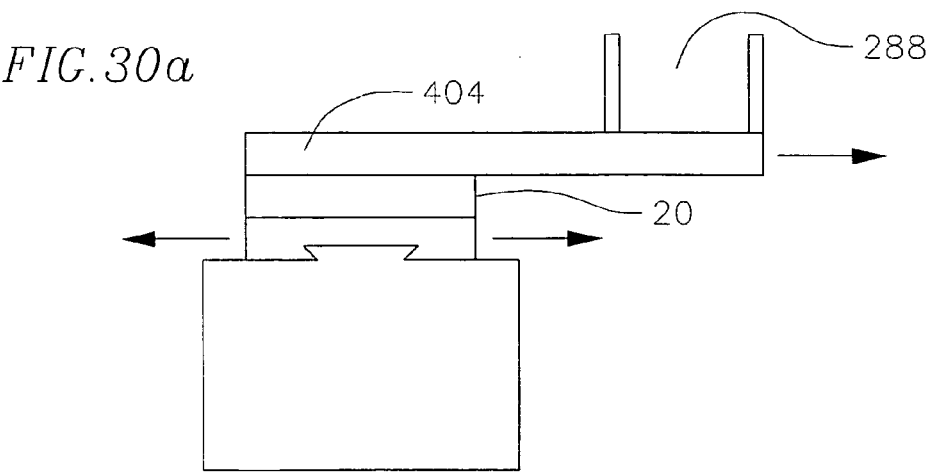
FIG. 30a-30c are a front view of a shuttle used for ocular preference selection.
Figure 30B:
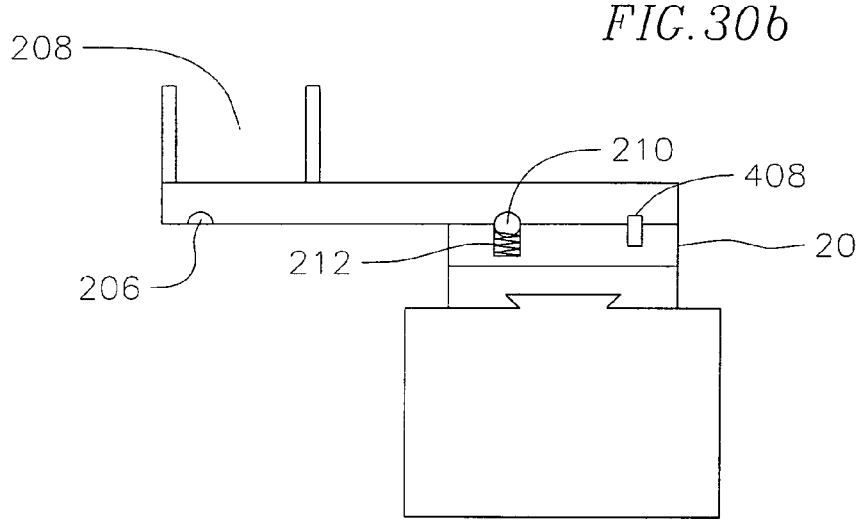
Figure 30C:
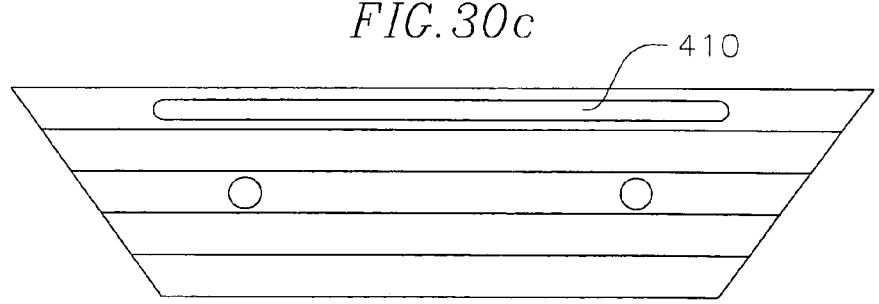

In another exemplary embodiment as shown schematically in FIGS. 30a-30c and also in FIGS. 31 and 32, a shuttle 404 is used to transfer ENVG between a user's left eye and right eye. The shuttle 404 is adapted to be slidably attached to a monorail 288 (described in more detail below) and also to the socket assembly 20, by using, for example, a dovetail joint. As shown in FIG. 30a, the socket assembly containing ENVG may be in a left-eye view position. In order to shift to a right-eye view position, the ENVG may first be pushed away from the user's face along the monorail 288 as is described in more detail below. Then, a lateral force may be applied to the ENVG which allows the socket assembly 20 to slide along the shuttle from the left side to the right side. A pin 408 protruding from the socket assembly 20 and traveling in a groove 410 in the shuttle 404 ensures that once the pin reaches an end of the groove, the socket assembly is prevented from sliding past the end of the shuttle. Additionally, a detent ball 210 and a detent spring 412 system fix the socket assembly 20 in its position at either end of the shuttle 404 until a force sufficient to overcome the detent ball and spring system is applied to the socket assembly. Once the pin 408 has encountered the end of the groove 410, if the lateral force is continued in the same direction, the shuttle will then be slid laterally across the monorail 288 until a stop on the shuttle is encountered, preventing the shuttle from being slid off of its connection with the monorail. Once the socket assembly 20 has reached its rightmost point (FIG. 30b), the socket assembly may be pulled back towards the user's face by sliding the socket assembly along the monorail 288 as is described in more detail below. As shown in FIGS. 33 and 34, the shuttle 404 may also be used with other eye relief distance mechanisms, such as a rack-based eye relief system.

Figure 35:
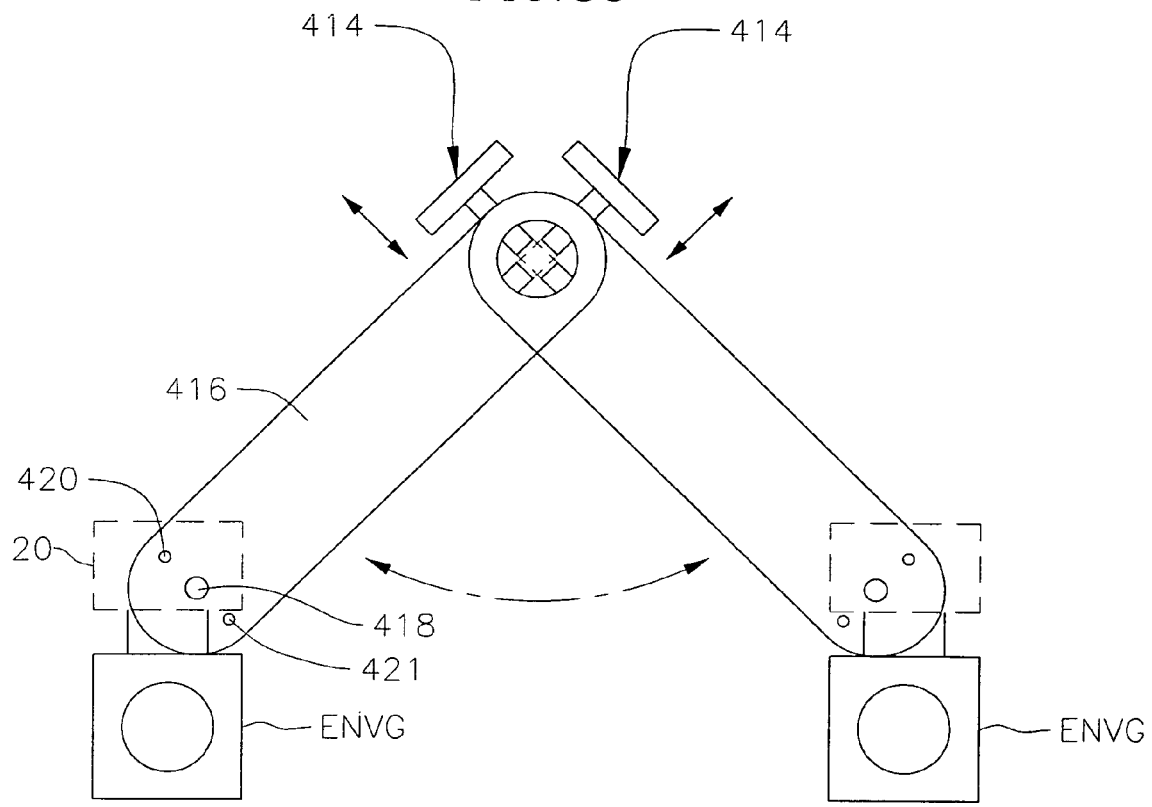
FIGS. 35 and 36 are front views of an alternate ocular preference mechanism.
Figure 36:
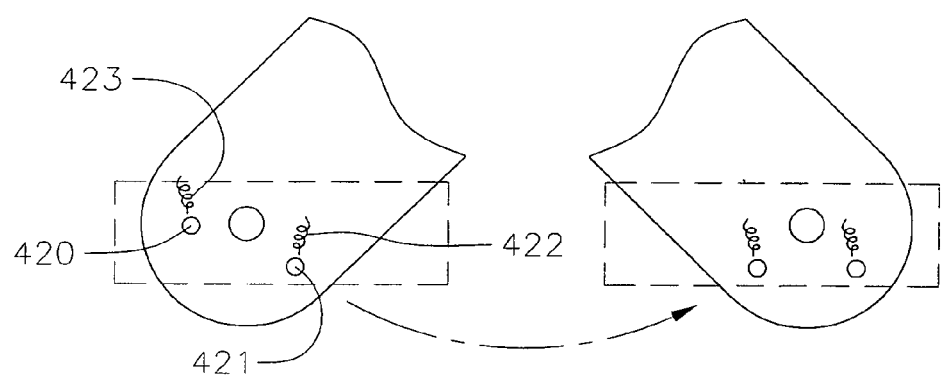
Figure 37:
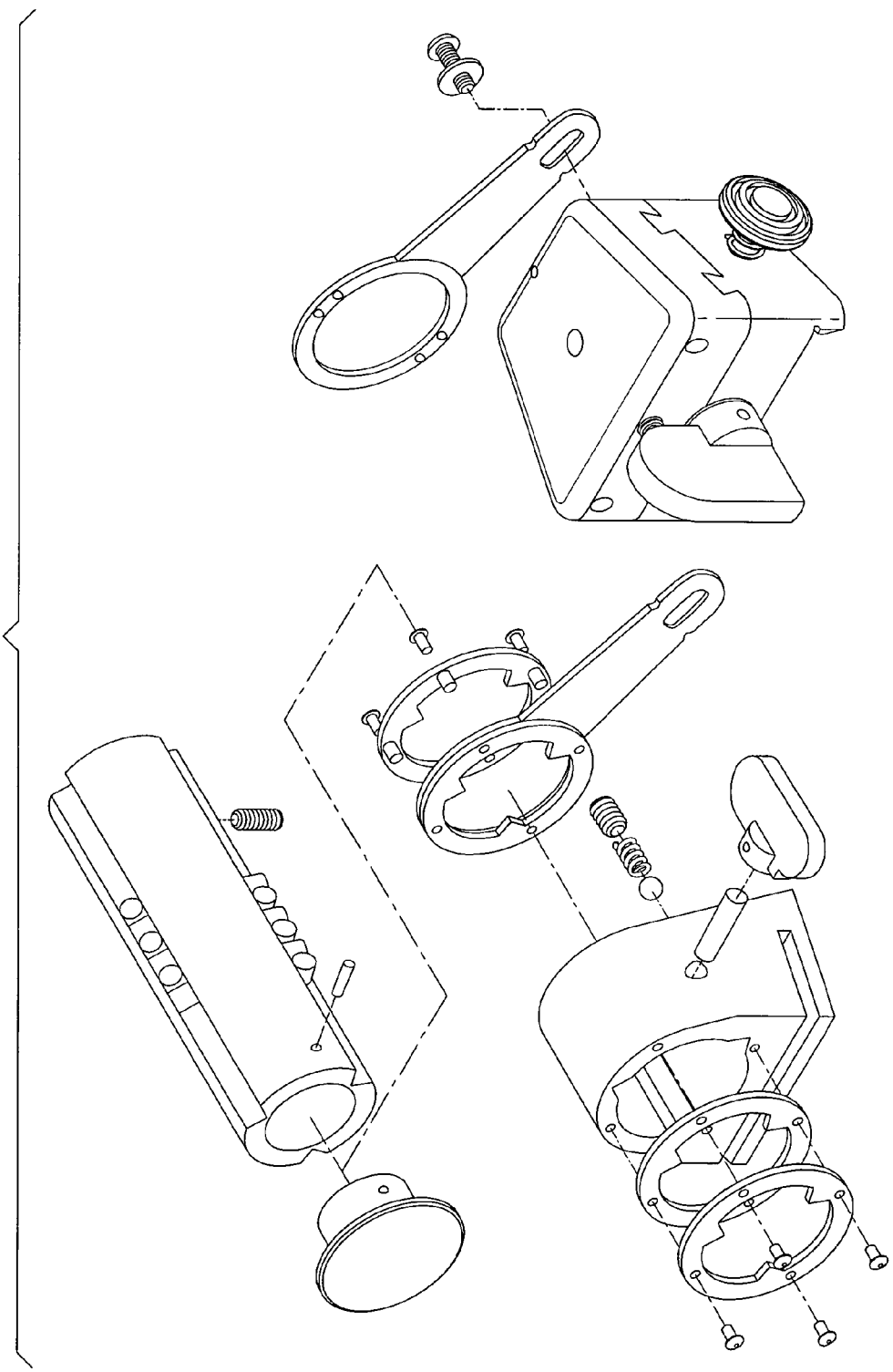
FIG. 37 is an exploded view of an alternate ocular preference mechanism.
Figure 39:
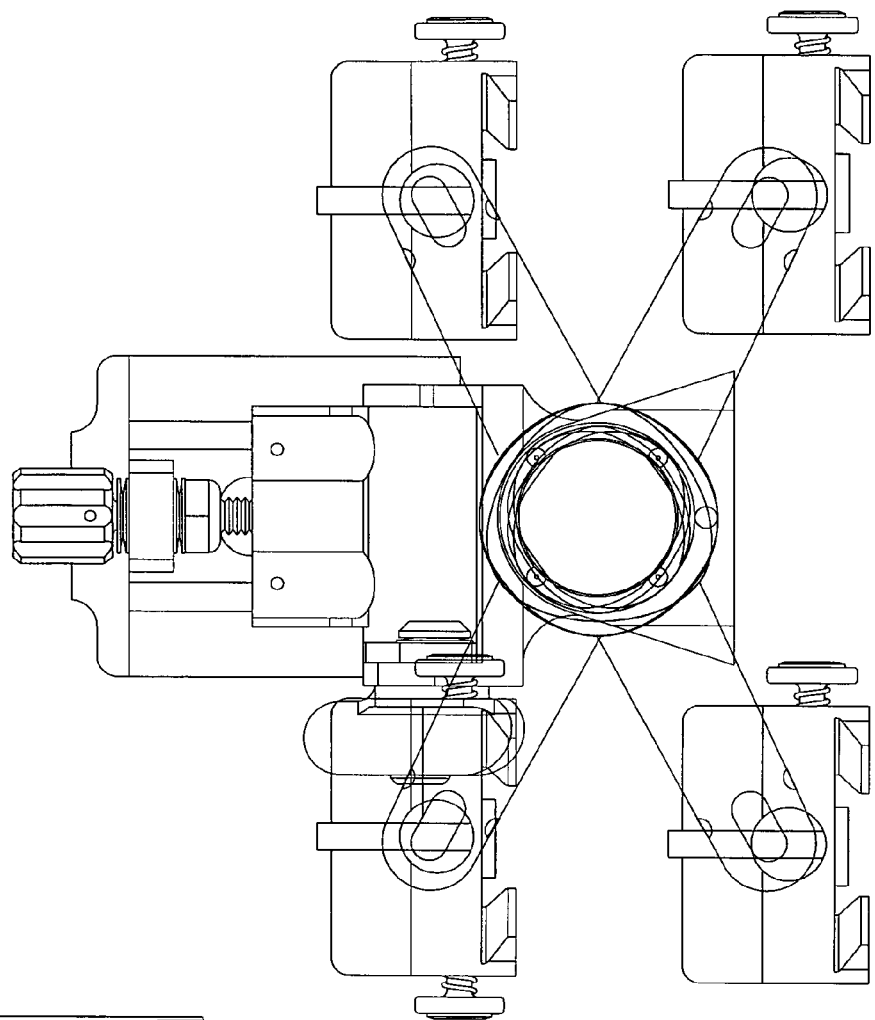
FIGS. 38 and 39 are a perspective view and a front view of a helmet mount incorporating the ocular preference mechanism of FIG. 37.
Figure 38:
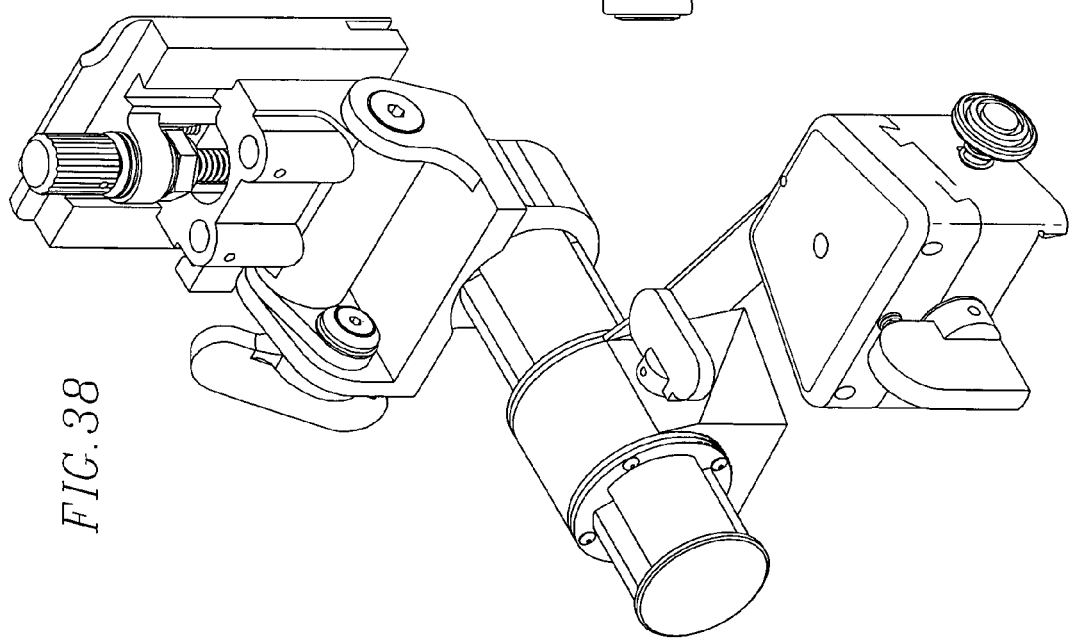

In yet another exemplary embodiment as shown schematically in FIGS. 35-39 a rotation system is used to transfer ENVG between a user's left eye and right eye. The rotation system includes a rotation link 416, the rotation link being rotatably attached to the monorail 288 (described in more detail below) and also being rotatably attached to the socket assembly 20. The socket assembly 20 contains two detent balls 420, 421 and two corresponding detent springs 422, 423 housed in two detent cavities (not shown) as shown in FIG. 36 and the rotation link contains two detent recesses (not shown) that are adapted to receive the detent balls 420, 421. When the detent balls 420, 421 are within the detent recesses, the socket assembly 20 is maintained in a fixed position as shown in FIG. 35.

As further shown in FIG. 35, a release pin 414 is inserted into a first pin cavity 424 in the monorail 288 to maintain the rotation link 416 at angled position so that the ENVG may be viewed through a user's left eye. In order for a user to rotate the ENVG from a left-eye view to a right-eye view, the socket assembly may be slid away from the user's face along the monorail 288 as is described in more detail below. Then, the user may pull up on the release pin 416 to disengage the release pin from the first pin cavity 424. The user may the apply a lateral force to rotate the rotation link 416 around a rotation pin 418 so that the socket assembly 20 is moved from a left-eye view to a right-eye view. Once the rotation link 416 has been rotated, the user may insert the pin into the second pin cavity 426 to fix the rotation link in place. As the rotation link 416 is moved between the left-eye view and the right-eye view, a force may be applied to the socket assembly 20 so that it disengages from the first detent ball 420 and second detent spring 422 and rotates to engage the second detent ball 421 and second detent spring 423.

Other embodiments may be adopted to allow for transfer of ENVG from one eye to the other without having to change the forward facing orientation of the ENVG during the transfer. For example, the ENVG may be attached to the mount through a swivel ball joint that would allow for such a transfer.

Figure 14:
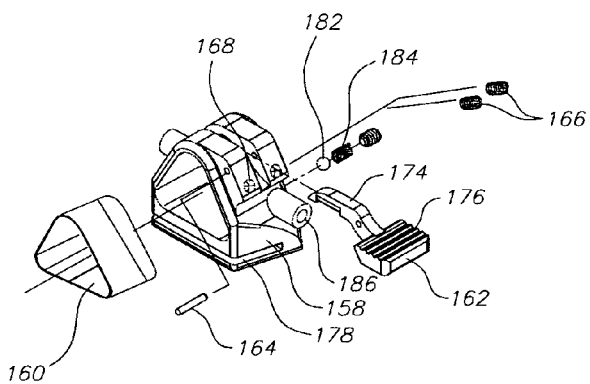
FIG. 14 is an exploded view of a monorail assembly of one embodiment of the present invention.

Referring now to FIGS. 14 to 18, a monorail assembly 50 is provided to allow for eye relief distance adjustment of the ENVG. Referring now to FIG. 14, a monorail 120 is provided having a generally hollowed triangular cross-section. The monorail 120 may have notches 122 along an outer surface to allow for eye relief distance adjustment as explained in more detail below. An end cap 124 may cover a distal end of the monorail 120 to prevent debris from entering the monorail. The end cap 124 may be held in place by interference fit and/or a pin 126 inserted through the monorail 120 and the end cap. The length of the monorail 120 may vary, but in one exemplary embodiment, the length of the monorail is about 60 mm. Additionally, the shape of the monorail is not limited to those described herein, but may also be, for example, cylindrical having bearing grooves adapted to receive roller bearings on which a carriage may slide.

Figure 18:
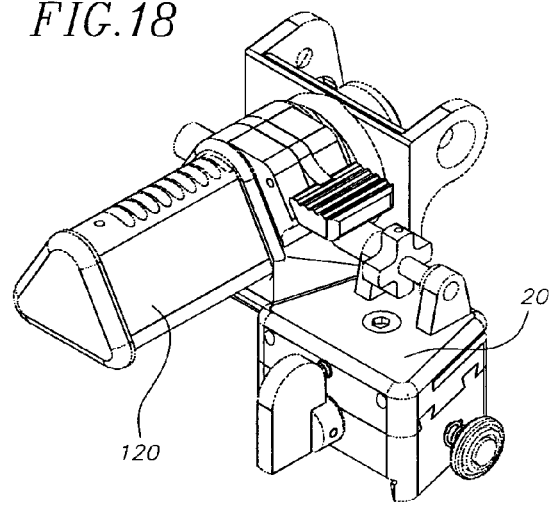
FIG. 18 is a perspective view of a combined monorail and socket assembly of one embodiment of the present invention.
Figure 17:
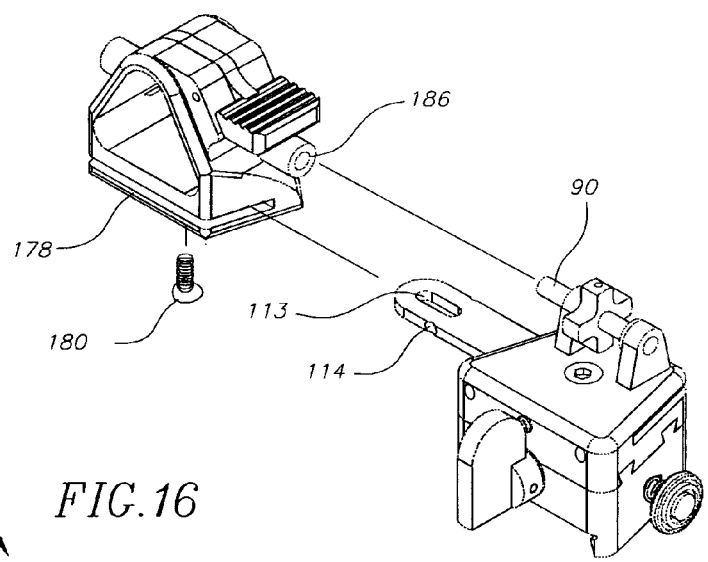
FIG. 17 is a perspective view of a separated carriage and socket assembly of one embodiment of the present invention.

The monorail 120 may be mounted to a chassis 128 as shown with reference to FIGS. 14 and 18. The chassis 128 has a base plate 130 adapted to receive a proximal end of the monorail 120. More specifically, the base plate includes a monorail attachment protrusion 140 which protrudes into a proximal end surface 132 (FIG. 15) of the monorail. A monorail attachment screw 131 is threaded through the monorail attachment protrusion 140, a bearing 133, and into the monorail 120. A set screw 135 is threaded through a surface of the monorail to prevent the monorail attachment screw 131 from separating from the monorail 120. The base plate also includes two flux conductors 138 and plunger recesses 156 for a rotary flip-up plunger 148 and spring 150 assembly. The spring 150 biases the plunger 148 into a recess 156 to provide resistance to rotation and fix the monorail 120 into a desired orientation. To change the orientation of the monorail 120, a force to overcome the plunger spring 150 may be applied to the monorail to rotate the monorail such that the plunger 148 is biased into another recess 156.

Figure 15:
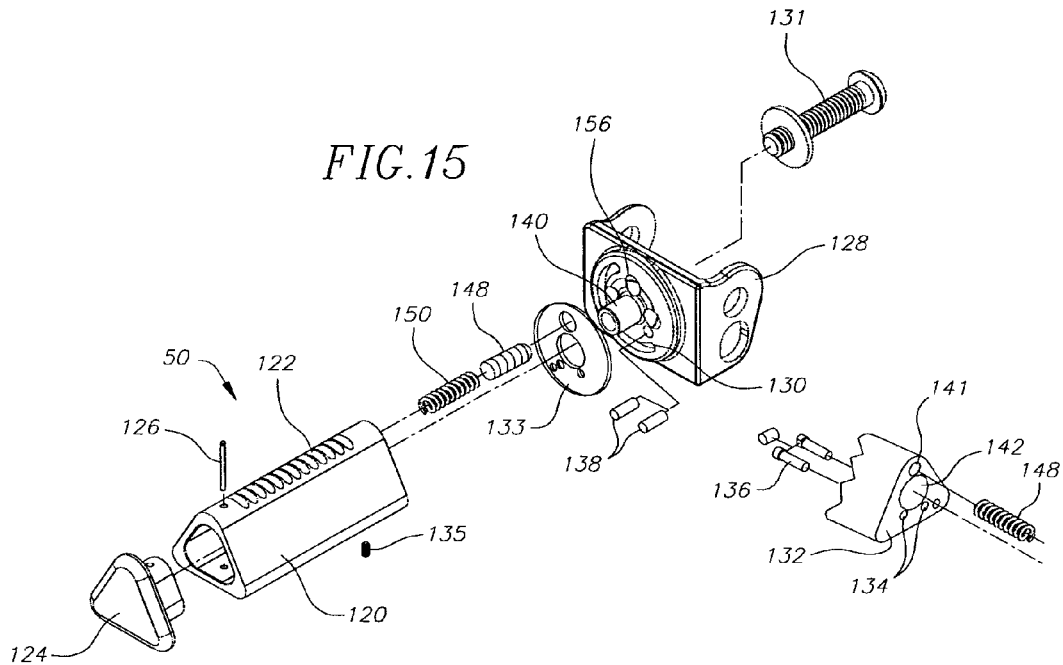
FIG. 15 is an exploded partial perspective view of a proximal end of a monorail of one embodiment of the present invention.

As shown in FIG. 15, the proximal end of the monorail 120 has an end surface 132 with holes 134 adapted to house flux conductors 136, a hole 141 through which the plunger 148 passes, and a hole 142 to receive the attachment protrusion 140 of the chassis. The flux conductors 136 of the monorail 120 and the flux conductors 138 of the chassis 128 interact with a magnet to turn the ENVG off and on based on the position of the ENVG. The operation of the flux conductors and the magnet is described in greater detail in U.S. patent application Ser. No. 11/473,749, Christie, Parker & Hale, filed Jun. 23, 2006 the entire content of which is incorporated herein by reference.

Figure 16:
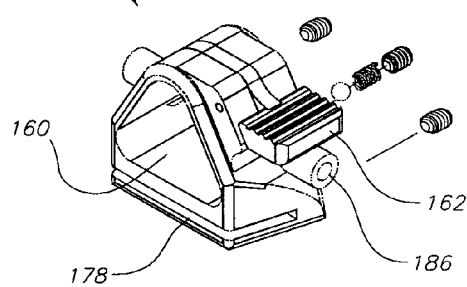
FIG. 16 is a perspective view of a carriage of one embodiment of the present invention.
Figure 19:
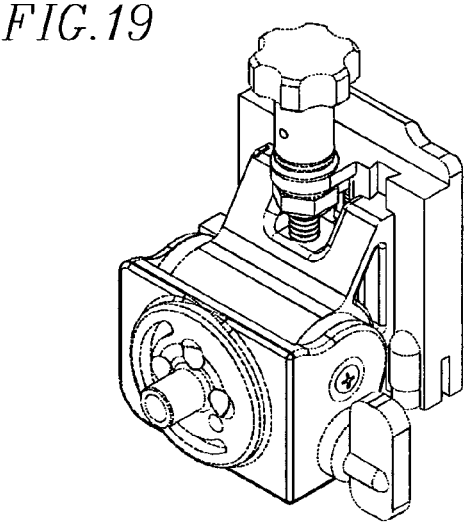
FIG. 19 is a front perspective view of a housing assembly of one embodiment of the present invention.

Referring now to FIGS. 14 and 16, a carriage 158 is adapted to be slidably attached to the monorail 120. The carriage 158 has a hollowed central opening 160 that has a cross-section corresponding to the cross-sectional shape of the monorail 120 to allow a smooth fit between the carriage and the monorail. In one exemplary embodiment, the surface of the central opening 160 is coated with TEFLON® to ensure that the carriage 158 will smoothly slide along the monorail 120.

An eye relief distance adjustment lever 162 is located on the carriage 158, the lever having a shaft 174 and a base 176. The base 176 serves as a platform to allow user to manipulate the lever 162 between an engaged state and a disengaged state. As such, the base 176 may have grooves that provide additional traction for a user's fingers. In the engaged state, the lever 162 is cradled in a notch 122 of the monorail 120 and serves to secure the carriage 158 in a fixed position relative to the monorail. In the disengaged state, the lever 162 is in a position such that the shaft 174 is not in contact with the monorail 120 and the carriage 158 is slidable along the monorail. The lever 162 is pivotable between the engaged state and the disengaged state around a lever pin 164 and is biased into the engaged state by a pair of lever springs 166 housed in lever spring recesses 168 on the carriage 158. By applying a downward force to the base 176, a user can overcome the spring bias and move the lever 162 from the engaged state to the disengaged state.

Similarly to the upper socket 24 described above, the carriage 158 has a swing link recess 178 adapted to receive an end of the swing link 84. The swing link 84 is attached to the carriage 158 by a swing link screw 180 (FIG. 17) inserted though a bottom surface of the carriage. A detent spring 184 biases a detent ball 182 against a release notch 114 and the swing link screw 180 rests against one end of the elongated slot 113 to keep the swing link 84 in an engaged state. If a user applies enough lateral force to the swing link 84 to overcome the resistance of the detent ball 182 and the detent spring 184, the swing link will become disengaged from the detent ball, the swing link screw 180 will rest against an opposite end of the elongated slot 113 and the swing link 84 will be pivotable around the swing link pin 180.

In order to keep the socket assembly 20 attached to and aligned with the carriage 158, the carriage may include a threaded lock shaft sleeve 186 adapted to receive the lock wheel shaft 90 of the socket assembly 20. As described in more detail below, when the lock wheel shaft 90 is threaded into the lock shaft sleeve 186, the socket assembly 20 will be coupled to and aligned with the carriage 158. When the lock wheel shaft 90 is removed from the lock shaft sleeve 186, the socket assembly may be rotated around the carriage 158.

An alternate embodiment of a monorail is shown in FIG. 28*a*, the monorail being generally cylindrical and having three bearing grooves 336 which are adapted to receive roller bearings 306. Additionally, a carriage 314 has a carriage lumen 332 adapted to slidably receive the monorail 288. The carriage lumen 332 includes three bearing grooves 334 adapted to receive roller bearings 306. When the carriage 314 is mounted onto the monorail 288 and roller bearings 306 are inserted into the bearing grooves 334, 336, the carriage is slidable along the monorail. Cover plates 310 attached to either opening of the carriage lumen 332 are shaped with bearing notches 338 which maintain the roller bearings 306 in the bearing grooves 334, 336.

When the carriage 314 is mounted on the monorail 288, the carriage may be in a fixed state or a sliding state. In the fixed state, a stop in the form of a threaded shaft 322, as shown in FIG. 28*b*, prevents the carriage 314 from sliding along the monorail 288. In order to move the carriage 314 into the sliding state, a user may release the threaded shaft 322 by rotating a lever 324. Thus, in the sliding state, the user will be able to slide the carriage 314 along the monorail 288. If the user then wishes to fix the carriage in a desired location, the user can rotate the lever 324 so that the threaded shaft 322 once again engages the monorail 288. The carriage 314 is slidable along the monorail 288 such that a part of the carriage may protrude past an end cap 342 (FIG. 28*a*) attached to a distal end of the monorail. This feature allows any dirt or debris that may accumulate in the bearing groove 336 to be flushed from the bearing groove so that the debris will not interfere with the operation of the monorail 288.

The monorail 288 is adapted to be rotated on its longitudinal axis to allow for a "quick stow" of ENVG. More specifically as shown in FIG. 28*a*, the monorail 288 includes an insert 290 adapted to house springs 304 longitudinally placed along its outer edge. Located at a proximal end of the spring 304 is a plunger 292 which is adapted to fit into a plunger cavity 340 located on a chassis 294. The plunger cavity 340 is substantially cross-shaped, wherein each "point" of the cross is adapted to receive a plunger 292. When the plungers 292 are housed in the plunger cavity 340, the monorail is in a fixed position. If enough rotational force is applied to the monorail to overcome the resistance of the springs 304 and plungers 292, the plungers will be ejected from the plunger cavity 340 as the monorail 288 is rotated until the plungers encounter the next "point" of the plunger cavity. Thus, the monorail 288 may be rotated from a first fixed position 90 degrees about its longitudinal axis to a second fixed position allowing the ENVG to be quickly and easily placed out of the field of vision of a user.

In yet another embodiment of the present invention is shown in FIG. 29 wherein a triangularly-shaped monorail 330 is combined with the carriage 344 as described with respect to FIGS. 28*a* and 28*b*. In one exemplary embodiment, a carriage lumen 346 may be coated with teflon to allow the carriage 344 to slide along the monorail 330. In another exemplary embodiment, the outer surface of the monorail 330 may be coated with teflon to allow the carriage 344 to slide along the monorail. Similarly to previously described embodiments, the monorail 330 may have an end cap 348 to prevent debris from entering the interior of the monorail.

A housing assembly for the helmet mount 10 will now be described with reference to FIGS. 19-22. As noted above, and also with reference to FIG. 14, a chassis 128 is adapted to receive the monorail 120. With reference now to FIG. 22, the chassis 128 is adapted to be attached to a helmet block 188 by the use of first and second side panels 190, 192. The first side panel 190 has a pivot lever hole 194 adapted to receive a pivot lever 196 and a tilt shaft hole 202 adapted to receive a tilt shaft 204. The pivot lever 196 is connected through the chassis 128 to a tilt arm 198, which is attached between the first side panel 190 and the helmet block 188. The tilt arm 198 has a pivot lever cavity 200 to which the pivot lever 196 is attachable with a screw (not shown) and a tilt shaft cavity 206 through which the tilt shaft 204 is inserted. Attached between the second side panel 192 of the chassis 128 is a pivot plate 208 which has a tilt shaft opening 210 and three tilt detents 212. The tilt shaft 204 is inserted though the chassis 128, the tilt arm 198, the helmet block 188 and the pivot plate 208 to allow a user to tilt the helmet mount 10 as explained in more detail below. An end cap 214 is screwed onto the tilt shaft 198 to couple the tilt shaft to the chassis 128.

The helmet block 188 includes a generally cylindrical base 216 and two feet 218 extending from the base. A tilt shaft channel 220 runs along a central longitudinal axis of the base and is adapted to house the tilt shaft 204. Each side of the base 216 further includes at least two detent spring recesses 222 which house a detent spring 224. A detent ball 226 placed at an end of the detent spring 224 abuts the tilt arm 198 or the pivot plate 208, both of which have detent ball recesses adapted to house the detent balls. As will be described in more detail below, the detent spring and detent ball assembly serves to rotatably secure the chassis in a use or a stowage position.

The feet 218 of the helmet block 188 extend from the base 216 to provide the helmet block with a substantially "L" shaped structure. Each foot 218 includes a dovetail protrusion 230 adapted to be slidably connected with a dovetail recess 232 on a housing 234. Located between the feet 218 is a threaded vertical screw cavity 254 which is adapted to receive a vertical adjustment screw 238 as described in more detail below.

The housing 234 may be a plate adapted to be coupled to a helmet (not shown). In addition to the dovetail recesses 232, the housing includes a vertical adjustment opening 236 which receives the vertical adjustment screw 238. The vertical adjustment screw 238 is attached to the helmet block 188 through a lock nut 240. A user may rotate the vertical adjustment screw 238 using a vertical adjustment knob 242 at the top of the vertical adjustment screw to move the helmet block 188 vertically along the housing 234, as described below.

Figure 20:
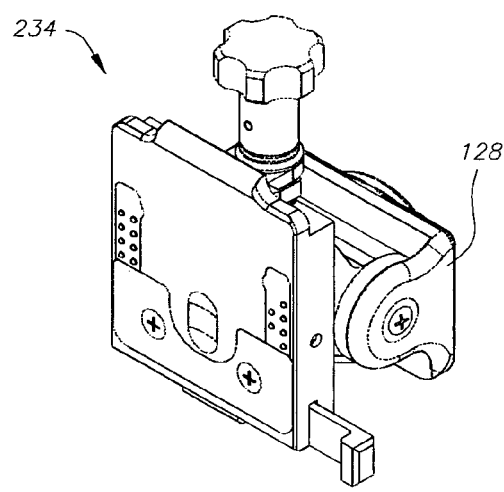
FIG. 20 is a rear perspective view of a housing assembly of one embodiment of the present invention.
Figure 21:
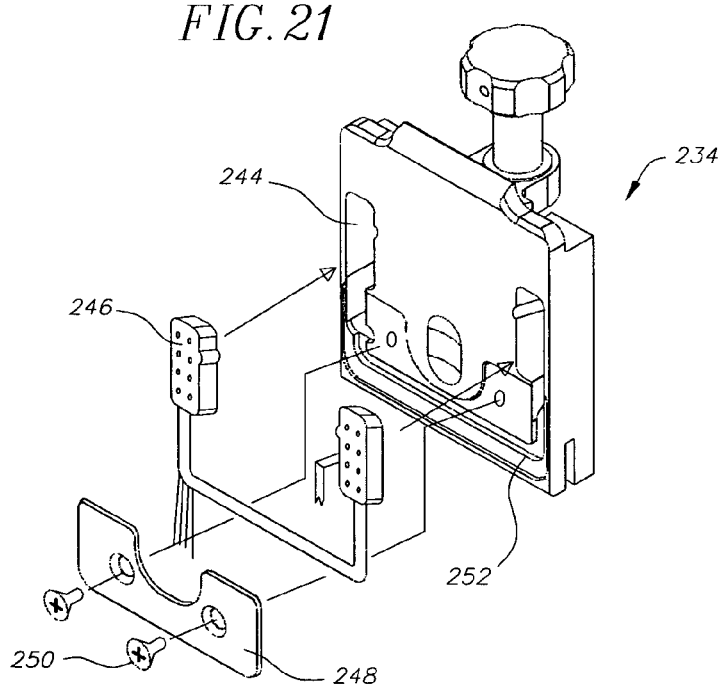
FIG. 21 is a rear exploded perspective view of a housing assembly of one embodiment of the present invention.
Figure 22:
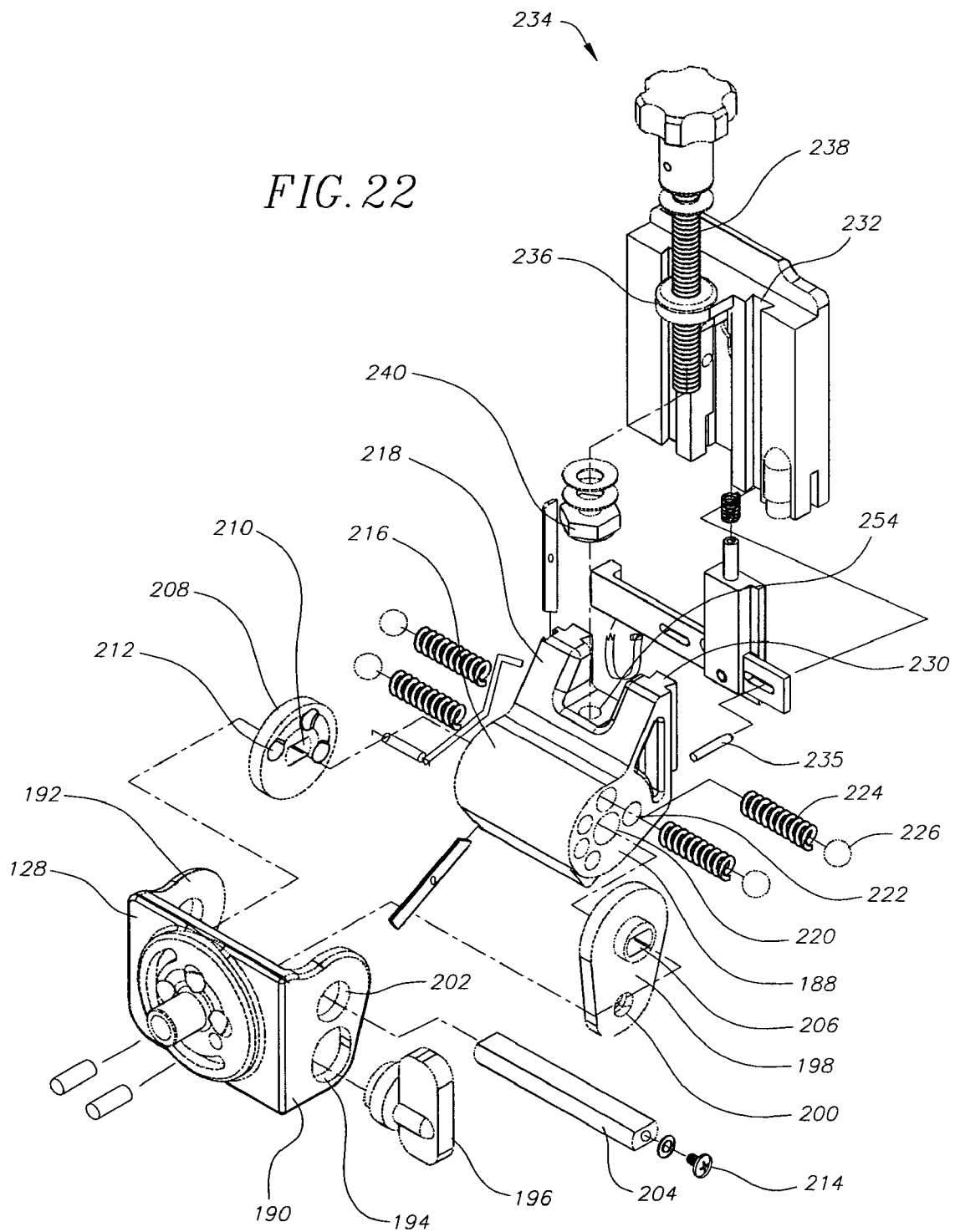
FIG. 22 is an exploded view of a housing assembly of one embodiment of the present invention.

Referring now to FIGS. 20 and 21, a rear view of the housing 234 is shown. A rear surface of the housing includes two pogo block recesses 244 which each house a pogo block 246. The pogo blocks 246 serve to electrically connect a power source on a headgear to the ENVG. A cover plate 248 adapted to fit into a cover plate groove 252 is placed to partially cover the pogo blocks 246 and attached to the housing by screws 250.

Figure 40:
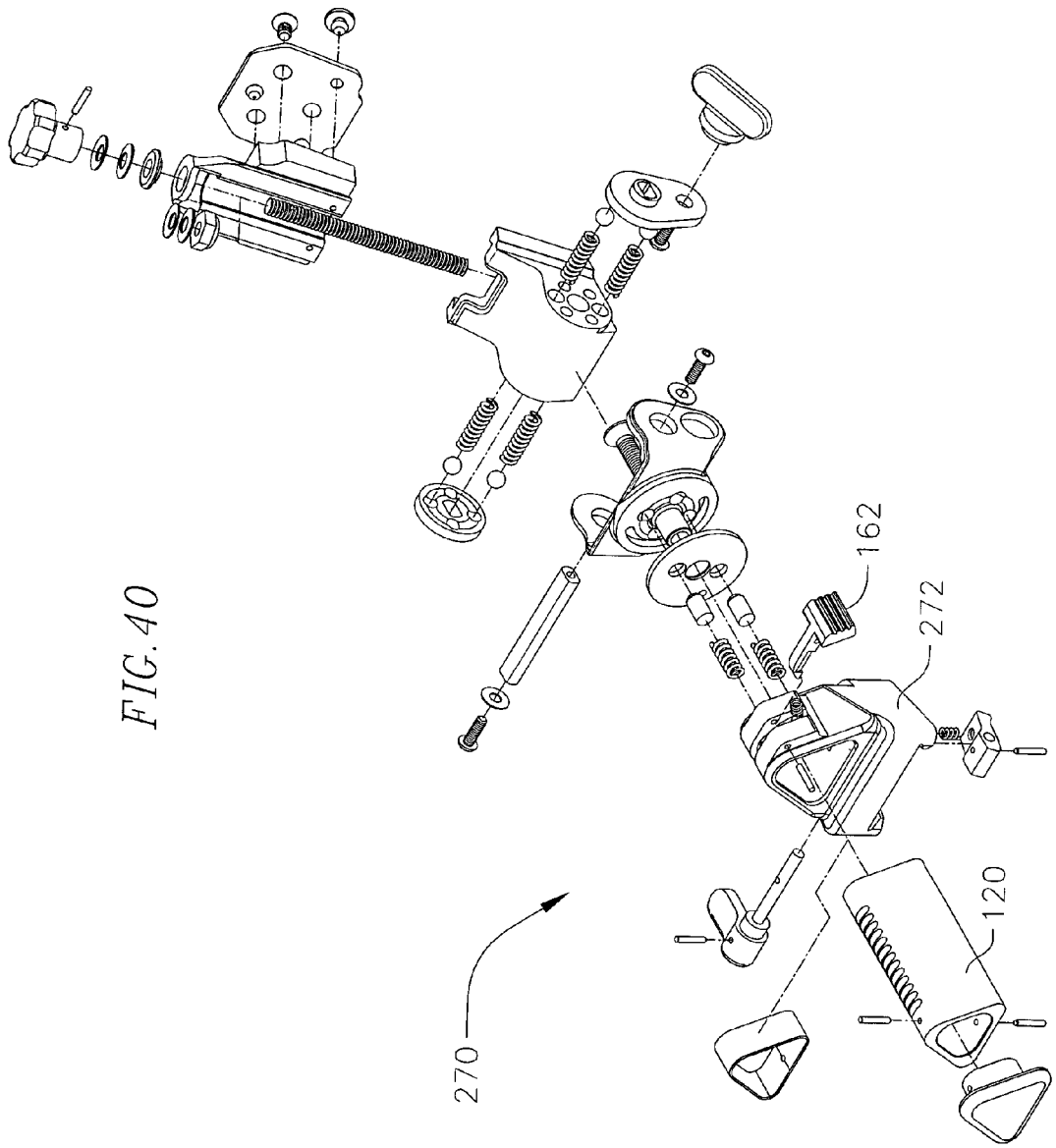
FIG. 40 is an exploded view of a monorail helmet mount for binocular enhanced night vision goggles.
Figure 41:
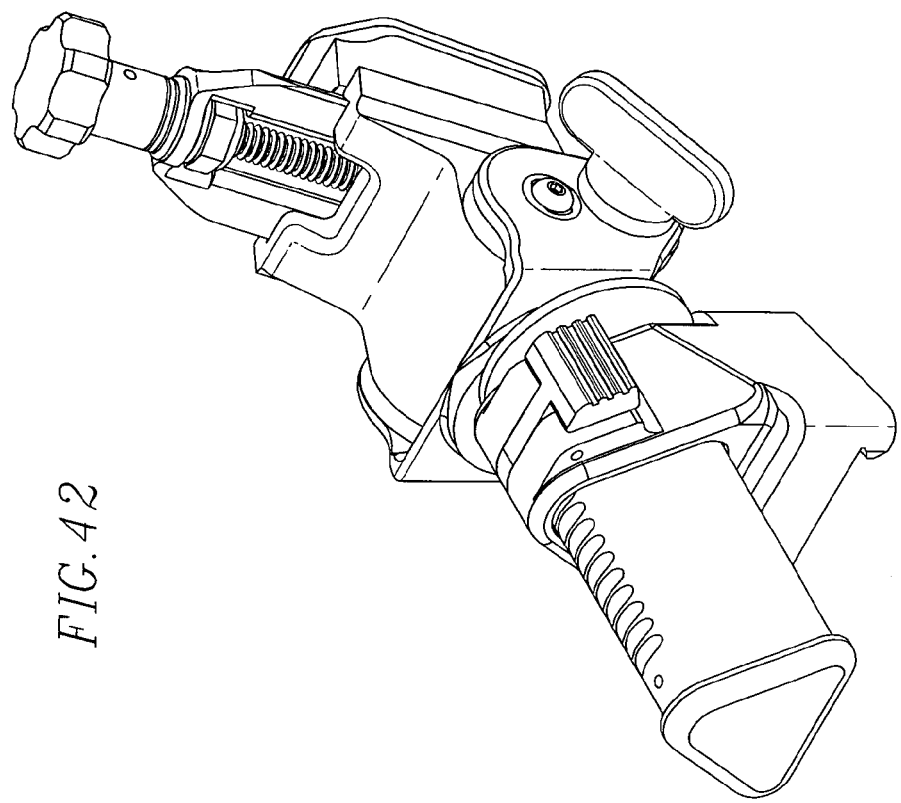
FIGS. 41 and 42 are perspective views of the helmet mount of FIG. 40.
Figure 42:
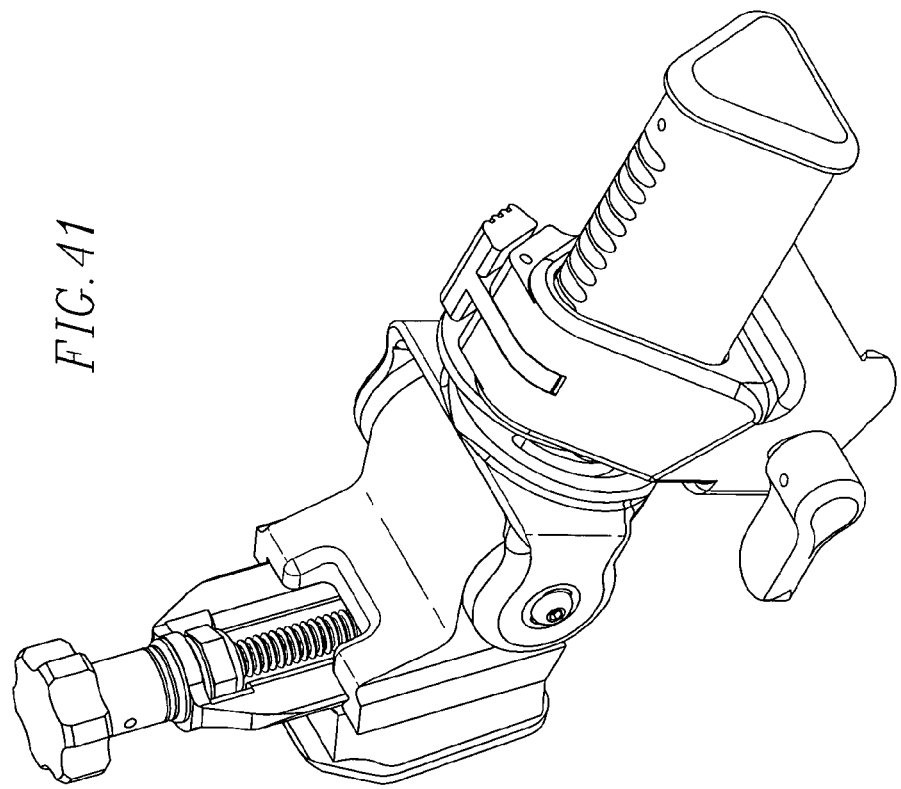

An alternate embodiment of the invention is adapted for use with binocular ENVG. As shown in FIG. 40, many of the components of the binocular ENVG mount 270 are substantially similar to those of the monocular ENVG mount 10 as described above. The binocular ENVG mount 270 includes a fused carriage 272 which incorporates a socket assembly adapted to receive binocular ENVG. Similarly to the lower socket 22 described above, the fused carriage 272 includes an ENVG receiving area 274 (FIG. 46) adapted to receive binocular ENVG. Additionally, the fused carriage is adapted to be slidable along the monorail when a user depresses the eye relief distance lever 162 and to be locked in place when a user releases the lever as described in more detail below. The fused carriage 272 allows binocular ENVG to be located centrally between a user's eyes as opposed to being offset to either side as for monocular ENVG.

The operation of various functional aspects of the monorail helmet mount for enhanced night vision goggles will now be described. More specifically, the monorail helmet mount allows for ocular preference selection without detaching the ENVG from the helmet mount, interpupillary adjustment of the ENVG, eye relief adjustment, vertical adjustment and two stowage options—flip-up stowage and rotational stowage.

Ocular Preference Selection

When used with ENVG that contain a single eyepiece for viewing, the monorail helmet mount 10 of the present invention allows for a user to choose which eye will be used without detaching the ENVG from the helmet mount. Additionally, if the user decides to switch viewing eyes while wearing a helmet with the monorail helmet mount 10 attached, the user may switch viewing eyes without detaching the ENVG from the helmet mount.

Figure 23:
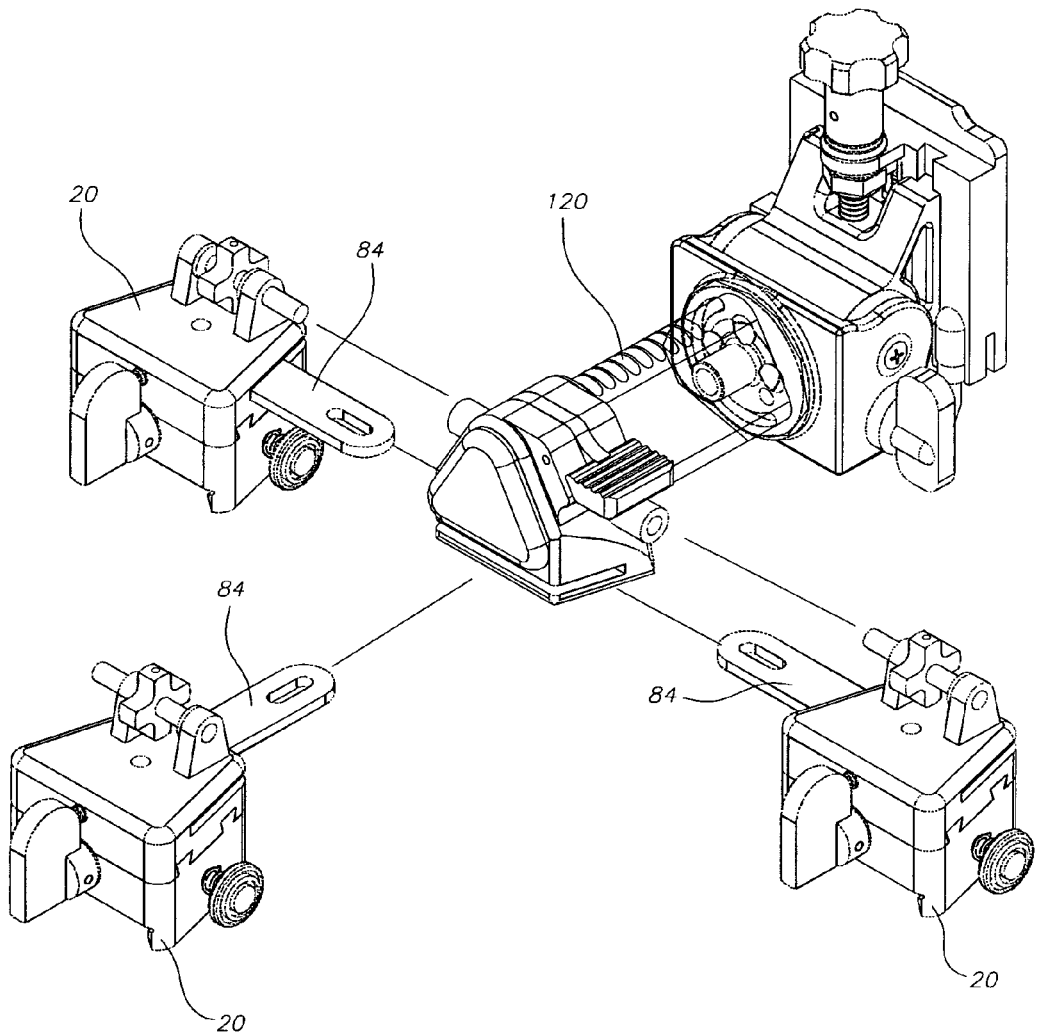
FIG. 23 illustrates various positions of one embodiment of the socket assembly as it may be rotated for eye preference.

Referring now to FIG. 18, the socket assembly 20 is shown in the left eye viewing position. In the left eye viewing position, the socket assembly 20 is located to the left of the monorail 120 when viewed from a user's perspective. Further, in this position, the threaded lock shaft 90 is threaded into the left side of the lock shaft sleeve 186 to maintain alignment between the socket assembly 20 and the carriage 158 and to lock the socket assembly in place. In order to move the socket assembly 20 from a left eye viewing position to a right eye viewing position, a user first unscrews the threaded lock shaft 90 from the lock shaft sleeve 186. Then, by applying a lateral force away from the monorail 120, the user can overcome the force of the detent ball and spring system of the carriage and of the socket assembly on the swing link 84. The swing link 84 is now in the disengaged position allowing the swing link to rotate around carriage 158 on the carriage swing link screw 180 and allowing the socket assembly 20 to rotate around the swing link on the socket assembly swing link pin 104. As shown in FIG. 23, when the socket assembly 20 is rotated around the monorail 120, the socket assembly maintains its orientation toward the user. In other words, regardless of which eye the user uses with the ENVG, the ENVG are always oriented with the eyepiece toward the user. Although FIG. 23 shows the swing link 84 disconnected from the carriage 158 for convenience, the swing link is intended to remain attached to the helmet mount assembly at all times. Once the user has moved the socket assembly 20 into the desired left eye or right eye viewing position, the user can apply a lateral force toward the direction of the monorail 120 to transform the swing link 84 from the disengaged state to the engaged state. Then, the user can thread the threaded lock shaft 90 into the lock shaft sleeve 186 on the opposite side to lock the socket assembly in place.

Interpupillary Adjustment

Figure 12:
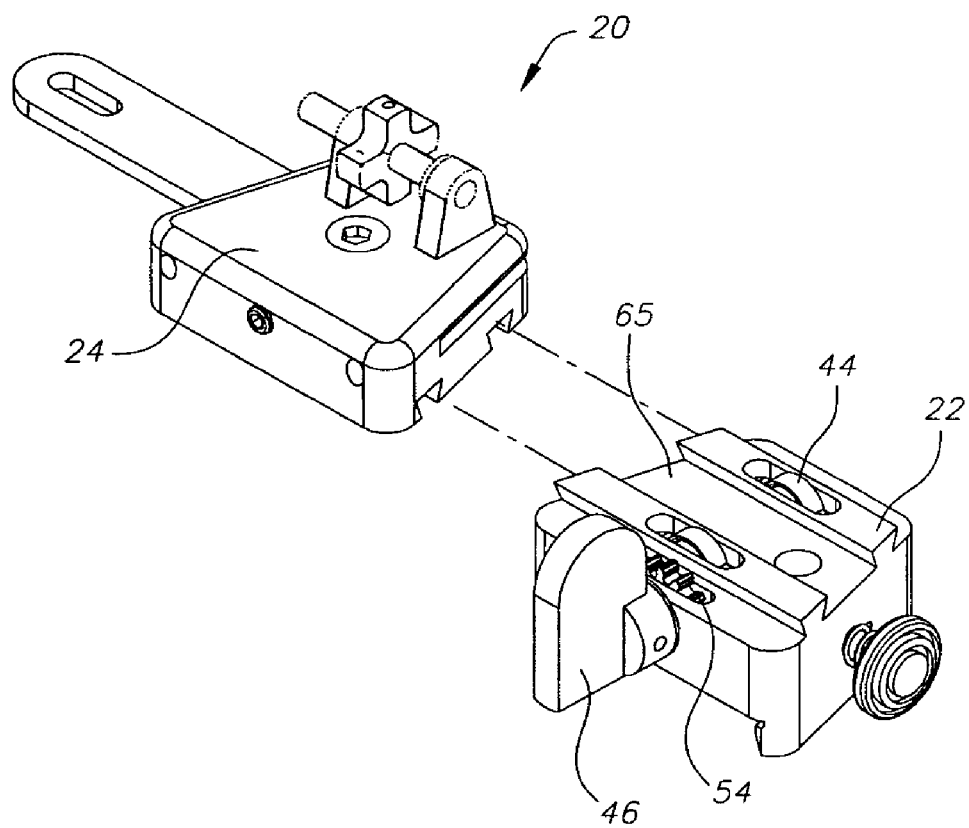
FIG. 12 is a perspective view of a separated socket assembly of one embodiment of the present invention.

Interpupillary adjustment of the monorail helmet mount device 10 allows a user to shift the ENVG laterally to align the eyepiece of the ENVG with the user's eye. Interpupillary adjustment is controlled through the socket assembly 20. The lower and upper sockets 22, 24 are joined by sliding the dovetail rails 28 of the lower socket into the dovetail recesses 30 of the upper socket as shown in FIGS. 12 and 13. Tension between the sockets 22, 24 is maintained by the leaf springs 44. To overcome the tension created by the leaf springs 44 and move the lower socket 22 which houses the ENVG, a user rotates the interpupillary adjustment lever 46. Rotation of the lever 46 corresponds to rotation of the gear 54 against the gear rack 76, allowing the lower socket 22 to slide along the dovetail recesses 30. Since the upper socket 24 is locked into position by the lock wheel assembly, the lower socket 22 moves with respect to the helmet mount. The lateral movement of the lower socket with respect to the upper socket is limited by the length of the gear rack 76 and by a lock pin 77 to prevent overrotation. In one exemplary embodiment, the amount of lateral movement by a centered socket assembly 20 is about 7 mm in either direction.

Eye Relief Adjustment

The monorail helmet mount 10 of the present invention allows a user to adjust the distance between ENVG attached to the helmet mount and the user's eye. Referring now to FIGS. 1 and 18, the carriage 158 is shown at a distal end (FIG. 1) and at a proximal end (FIG. 18) of the monorail 120. To slide the carriage along the monorail, thereby adjusting eye relief distance, a user applies a downward force on the eye relief distance lever 162 to overcome resistance provided by springs 166. Pressing on the lever 162 disengages the lever shaft 174 from a notch 122 on the monorail 120, allowing the carriage 158 to be slidable along the monorail while the shaft remains disengaged. Once the desired location has been reached, the user may release the lever 162, allowing the shaft to reengage a notch 122 on the monorail 120 and thereby fix the position of the carriage 158 with respect to the monorail. The carriage 158 is prevented from being slidable off the distal end of the monorail 120 by the end cap 124, the edges of which protrude past the edges of the monorail, thereby blocking further distal movement of the carriage. The amount of adjustment is generally limited by the length of the monorail 120.

Tilt Adjustment

A user may adjust the angle through which a scene is viewed through ENVG using the tilt adjustment feature of the monorail helmet mount assembly 10. Referring to FIGS. 1 and 22, the chassis 128 is pivotable around the helmet block 188, and more specifically, the chassis is pivotable around the tilt shaft 204. When a user rotates the pivot lever 196, the cam force of the pivot lever shaft against the pivot lever hole 194 allows the chassis 128 to rotate in either direction around the helmet block. Although the pivot lever 196 is shown on the left side of the helmet block 188, the pivot lever may also be on the right side or on both sides.

Vertical Adjustment

The vertical adjustment screw 238 is provided to allow vertical adjustment of ENVG via the helmet mount 10. To adjust the level of the ENVG with respect to a user's eyes, the user may rotate the vertical adjustment screw using the knob 242 positioned at the top of the screw. As the screw rotates, the dovetailed feet 218 of the helmet block 188 slide along the dovetail recesses 232 of the housing 234. At least one stop pin 235 prevents overrotation of the vertical adjustment screw 238, thus keeping the housing 234 attached to the helmet block 188. The knob 242 is grooved allowing for a firm grip even during wet or slippery conditions.

Stowage

Stowage of the ENVG will now be described with reference to FIGS. 14 and 24-27. The helmet mount 10 provides for two types of stowage: quick stowage and flip-up stowage. To quickly stow the ENVG, a user may rotate the helmet mount by applying a lateral force to the ENVG to overcome the resistance provided by the plunger 148. When sufficient force is applied, the plunger 148 is ejected from a first plunger recess 156 and allows the monorail 120 to be rotated until the plunger is biased by the plunger spring 150 into another plunger recess 156. The effect of the quick stowage function of the helmet block 10 is to allow a user to quickly rotate the ENVG from a line of sight and then allow for quick rotation of the ENVG back into the light of sight. In one exemplary embodiment, as shown in FIGS. 44 and 46, the helmet mount may be rotated to the user's left or right side while maintaining the ENVG in the user's peripheral vision.

Figure 24:
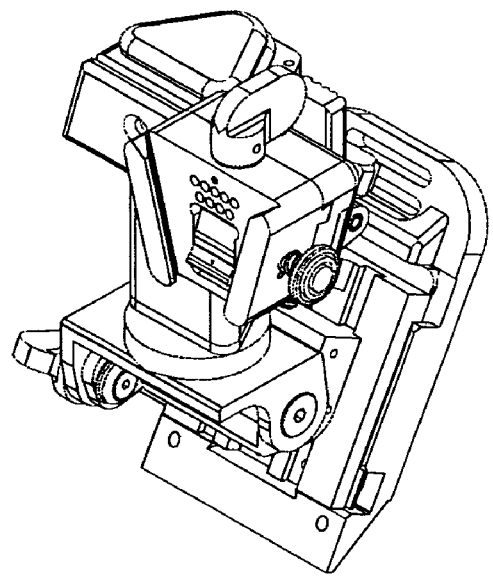
FIG. 24 illustrates one embodiment of the helmet mount in a flipped-up position, the socket assembly set up for left eye viewing.
Figure 25:
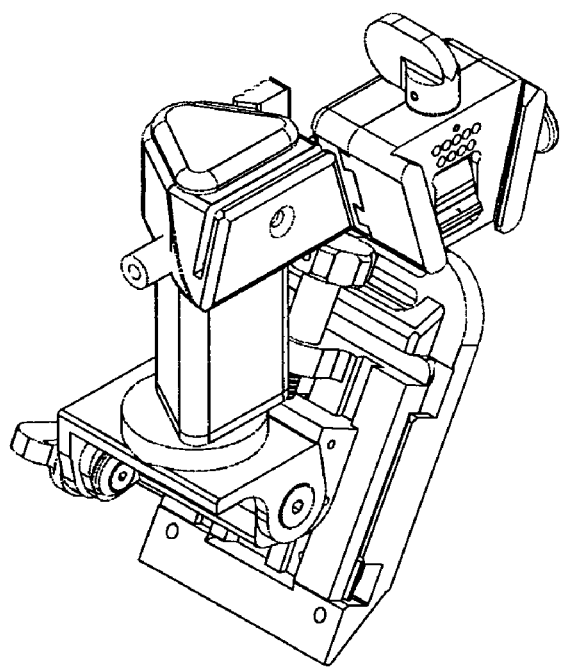
FIG. 25 illustrates one embodiment of the helmet mount in a stowed position, the socket assembly set up for left eye viewing.
Figure 26:
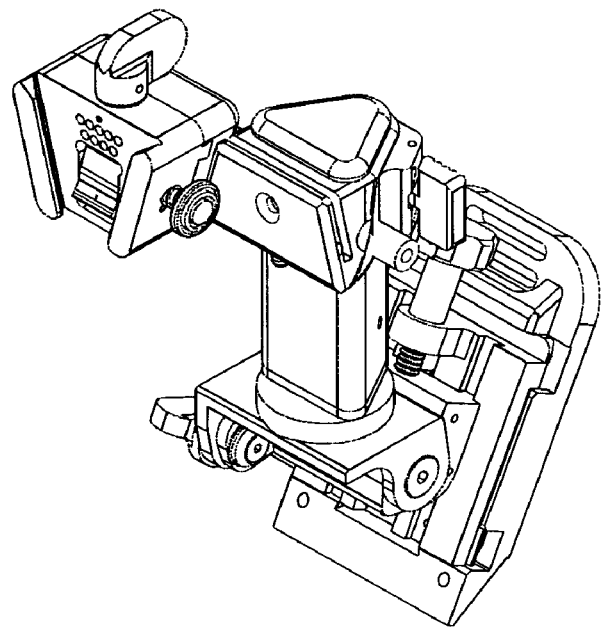
FIG. 26 illustrates one embodiment of the helmet mount in a flipped-up position, the socket assembly set up for right eye viewing.
Figure 27:
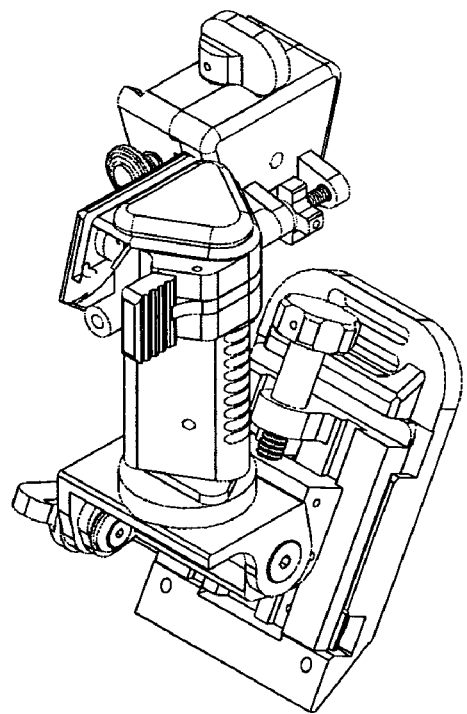
FIG. 27 illustrates one embodiment of the helmet mount in a stowed position, the socket assembly set up for right eye viewing.

The user also has the option of flip-up stowage, allowing complete removal of the ENVG from a user's line of sight. By applying an upward force to the helmet mount 10 sufficient to overcome the resistance of the detent ball and spring system 224, 226, the chassis 128 will pivot on the tilt shaft 204 to rotate around the helmet block 188, as shown in FIGS. 24 and 26. When the detent ball 224 reaches another detent recess 228, it will hold the chassis 128 in a fixed position until a force to overcome the resistance is applied to the chassis. Additionally, once the chassis 128 is in the flipped-up position, the monorail 120 may be rotated by application of a lateral force in a manner similar to the quick stowage mechanism as described above and shown in FIGS. 25 and 27. In one exemplary embodiment, in the flipped up position the highest point of the monorail helmet mount 10 (i.e., the distal end of the monorail 120) is about equal to or less than the top of the user's helmet, thus limiting the distance between a user and the ENVG and reducing the likelihood that the ENVG will be damaged by the user in the field.

Although the present invention has been described through the use of exemplary embodiments, it will be appreciated by those of skill in the art that various modifications may be made to the described embodiments that fall within the scope and spirit of the invention as defined by the claims and their equivalents appended hereto.

What is claimed is:

1. A mount for night vision goggles, the mount comprising:
   a housing adapted to secure the mount to headgear;
   a vertical block slidably coupled to the housing, wherein the vertical block can be translated in a vertical movement with respect to the housing through a vertical adjustment knob that is in communication between the vertical block and housing;
   a chassis rotatably coupled to the vertical block, wherein the chassis is rotatable about a chassis rotation axis between an in-use position and a flip-up stowage position wherein the chassis rotation axis is substantially perpendicular to the vertical movement of the vertical block;
   a monorail rotatably coupled to the chassis, wherein the monorail substantially extends longitudinally from the chassis and wherein the monorail rotates about a longitudinal axis such that the monorail can be rotated between the in-use position and a quick stowage position;
   a carriage slidably coupled to the monorail, wherein the carriage has a carriage lumen adapted to slidably receive the monorail and wherein the carriage slides transversely along the longitudinal axis of the monorail providing an eye relief adjustment movement; and
   a socket assembly coupled to the carriage wherein the socket assembly has a night vision goggle attachment feature whereby the night vision goggles can be secured to the socket assembly.

2. The mount of claim 1, wherein the socket assembly is movably coupled to the carriage such that the socket assembly may be relocated on an opposite side of the carriage and remain facing the same direction thereby allowing the night vision goggles to be utilized for the in-use position with both a left and right eye of a user.

3. The mount of claim 2, wherein the socket assembly further comprises an upper socket, a lower socket, and an interpupillary adjustment lever wherein the upper socket and lower socket are slidably coupled together and wherein the interpupillary adjustment lever is coupled to the upper socket and lower socket such that an adjustment of the interpupillary adjustment lever slidably translates the lower socket with respect to the upper socket thereby providing an interpupillary adjustment movement, and wherein the lower socket includes the night vision goggle attachment feature whereby the night vision goggles can be secured.

4. The mount of claim 3, further including a pivot lever coupled to the chassis in communication between the vertical block and chassis such that movement of the pivot lever rotates the chassis about the chassis rotation axis to a fine degree of resolution providing a tilt adjustment feature.

5. The mount of claim 4, further including a carriage stop connected to the carriage and in communication with the monorail such that the carriage stop may be disengaged to allow the carriage to transversely slide along the monorail, and thereafter the carriage stop may be engaged securing the carriage in a stationary position relative to the monorail.

6. The mount of claim 5, further including a swing link having a first and second end, wherein the first end is rotatably coupled to the carriage and the second end is rotatably coupled to the upper socket, wherein the upper socket may rotate about the second end of the swing link along a swing plane while simultaneously the first end of the swing link rotates about the chassis along the swing plane such that the upper socket remains in a forward facing orientation thereby allowing an ocular preference selection between the left and right eye, wherein the swing plane is parallel to both the interpupillary adjustment movement and the eye relief adjustment movement.

7. The mount of claim 6, further including a socket assembly lock coupled to the upper socket which may be in direct communication with the carriage such that the socket assembly lock securely affixes the upper socket in a locked position with respect to the carriage to prevent an accidental movement of the upper socket once an ocular preference has been established.

8. The mount of the claim 7, wherein the socket assembly lock is comprised of a threaded rod with a lock shaft wheel and wherein the upper socket is further comprised of two narrow extrusions, each with a hole, thereby allowing the threaded rod to slide and rotate within the holes, and wherein the carriage is further comprised of threaded receptacles on opposite sides configured to accept the threaded rod such that the threaded rod may be threaded into the threaded receptacles thereby securing the upper socket assembly in either opposite side of the carriage.

9. The mount of claim 8, wherein the housing is secured substantially along a centerline of the helmet, wherein the housing comprises a tongue, a lock, a lock spring and an actuator, wherein the tongue is located at one end of the housing and is adapted to fit into a first mount recess in the helmet and wherein the lock and lock spring are slidably coupled to the housing at the other end such that the lock will become secured against a second mount recess in the helmet when force is used to overcome the lock spring thereby holding the housing stationary in relation to the helmet and wherein the actuator is movably coupled to the housing such that movement of the actuator compresses the lock spring releasing the lock to allow removal of the housing from the helmet.

10. The mount of claim 5, further including a shuttle having a first and second end, wherein the first end is slidably coupled to the carriage and the second end is slidably coupled to the upper socket, wherein the shuttle may slide along a shuttle axis from the first end to second end while the upper socket may slide along the shuttle axis from the second end to the first end such that the upper socket remains in a forward facing orientation thereby allowing an ocular preference selection, wherein the shuttle axis is parallel to the interpupillary adjustment movement.

11. The mount of claim 5, further including a rotation link having a first and second end, wherein the first end is rotatably coupled to the carriage and the second end is rotatably coupled to the upper socket, wherein the upper socket may rotate about the second end of the swing link along a rotation plane while simultaneously the first end of the rotation link rotates about the chassis along the rotation plane such that the upper socket remains in a forward facing orientation thereby allowing an ocular preference selection, wherein the rotation plane is parallel to the interpupillary adjustment movement and perpendicular to the eye relief adjustment movement.

12. A mount for night vision goggles, the mount having an eye relief adjustment means, the eye relief adjustment means comprising:
   a monorail having a longitudinal axis, the monorail extending from the mount along the longitudinal axis; and
   a carriage slidably coupled to the monorail, wherein the monorail is rotatable about the longitudinal axis to rotate the carriage relative to the mount; wherein the carriage has a carriage lumen configured to slidably receive the monorail and wherein the carriage slides traversely along the longitudinal axis of the monorail to provide an eye relief adjustment movement.

13. The mount of claim 12, the monorail further comprising a plurality of notches and the carriage further comprising an eye distance relief lever adapted to be received in a notch,
   wherein the eye distance relief lever has a disengaged state wherein the eye distance relief lever is not in contact with a notch, allowing the carriage to slide along the monorail; and
   wherein the eye distance relief lever has an engaged state wherein the eye distance relief lever is received in a notch, to prevent the carriage from sliding with respect to the monorail.

14. The mount of claim 12, wherein the monorail is rotatable about the longitudinal axis between a use position and a stowage position.

15. The mount of claim 12 further comprising a chassis, wherein the chassis is rotatable around a chassis rotation axis between a use position and a flip-up stowage position wherein the chassis rotation axis is substantially perpendicular to the longitudinal axis of the monorail.

16. The mount of claim 12, wherein the monorail has a substantially triangular cross section.

17. The mount of claim 12, wherein the monorail has a substantially circular cross section.

18. A mount for night vision goggles, the mount comprising a socket assembly having a night vision goggle attachment feature whereby night vision goggles are securable to the socket assembly, the night vision goggle attachment feature comprising:
   a tip-in interface having a night vision goggle receiving area defined by a base surface and a plurality of sidewalls extending from the base surface;
   at least one notch opening on one of the plurality of sidewalls, the at least one notch opening configured to receive a notch from a night vision goggle hot shoe; and
   a rotatable goggle catch between the plurality of side walls, the rotatable goggle latch configured to receive a latch from the night vision goggle hot shoe for releasably securing the night vision goggle hot shoe in the night vision goggle receiving area.

19. A mount for monocular night vision goggles, the mount comprising:
   a housing configured to secure the mount to headgear;
   a monorail rotatably coupled to the housing, the monorail having a longitudinal axis and extending from the housing along the longitudinal axis; wherein the monorail is rotatable about the longitudinal axis relative to the housing;
   a carriage attached to the monorail for eye relief adjustment of the monocular night vision goggles; and
   ocular preference selection means, the ocular preference selection means comprising:
      means for removably locking the monocular night vision goggles in front of a first eye; and
      a shuttle configured to be laterally slidable along the carnage to shift the monocular night vision goggles from in front of the first eye to in front of a second eye of a user.

20. A mount for monocular night vision goggles, the mount comprising:
   a housing adapted to secure the mount to headgear;
   a monorail rotatably coupled to the housing, the monorail having a longitudinal axis and extending from the housing along the longitudinal axis; wherein the monorail rotates about the longitudinal axis between an in-use position and a quick stowage position; and
   ocular preference selection means, the ocular preference selection means comprising:
      means for removably locking the monocular night vision goggles in front of a first eye; and
      a swing link for shifting the monocular night vision goggles from in front of the first eye to in front of a second eye of the user, wherein the swing link rotates about an axis generally perpendicular to the longitudinal axis of the monorail.

* * * * *

UNITED STATES PATENT AND TRADEMARK OFFICE
CERTIFICATE OF CORRECTION

PATENT NO. : 7,735,159 B2  Page 1 of 1
APPLICATION NO. : 11/473495
DATED : June 15, 2010
INVENTOR(S) : Prendergast It is certified that error appears in the above-identified patent and that said Letters Patent is hereby corrected as shown below:

Column 16, Claim 19, Line 41      Delete "carnage"
                                  Insert -- carriage --

Signed and Sealed this
Twenty-sixth Day of April, 2011

David J. Kappos
*Director of the United States Patent and Trademark Office*